(12) United States Patent
Beringer et al.

(10) Patent No.: US 7,444,675 B2
(45) Date of Patent: Oct. 28, 2008

(54) SYSTEMS AND METHODS FOR DEFINING SECURITY INFORMATION FOR WEB-SERVICES

(75) Inventors: Dorothea Beringer, Sergy (FR); Guillaum Vambenepe, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 937 days.

(21) Appl. No.: 10/376,693

(22) Filed: Feb. 28, 2003

(65) Prior Publication Data
US 2004/0172555 A1 Sep. 2, 2004

(51) Int. Cl.
G06F 21/24 (2006.01)
G06F 17/30 (2006.01)
H04L 9/00 (2006.01)

(52) U.S. Cl. .......................... 726/14; 713/152; 713/176
(58) Field of Classification Search ................. 713/152, 713/161, 165, 167; 726/14
See application file for complete search history.

(56) References Cited

U.S. PATENT DOCUMENTS

| | | | |
|---|---|---|---|
| 2002/0046286 A1* | 4/2002 | Caldwell et al. | 709/229 |
| 2003/0028495 A1* | 2/2003 | Pallante | 705/78 |
| 2003/0200465 A1* | 10/2003 | Bhat et al. | 713/202 |
| 2003/0204719 A1* | 10/2003 | Ben-Itzhak | 713/152 |
| 2003/0217139 A1* | 11/2003 | Burbeck et al. | 709/224 |
| 2004/0117320 A1* | 6/2004 | Morioka et al. | 705/76 |

OTHER PUBLICATIONS

World Wide Web, http://www.microsoft.com/hk/vstudio/launch/download/SVR349.ppt, Hugo Sin, "Orchestrating Public XML Web Services with BizTalk Server 2002," Mar. 7, 2002, 47 pages.
World Wide Web, http://www-106.ibm,com/developerworks/library/ws-peer4/, Graham Glass, "The Web Services (R)evolution: Part 4," Feb. 2001, printed on Dec. 9, 2002.
World Wide Web, http://www-106.ibm.com/developerworks/library/ws-soap/index.html, Uche Ogbuji, "Using WSDL in Soap Applications," Nov. 2000, printed on Dec. 9, 2002, 6 pages.
World Wide Web, http://www.-106.ibm.com/developerworks/library/ws-intwsdl2/, Bilal Siddiqui, Deploying Web Services with WSDL, Part 2: Simple Object Access Protocol (SOAP), Mar. 2002, printed on Dec. 9, 2002, 15 pages.
World Wide Web, http://www.topxml.com/b2b/articles/biztalk_unleashed/1_intro.asp, "TopXML," Introduction to bizTalk, printed on Dec. 9, 2002, 5 pages.
World Wide Web, http://searchdatabase.techtarget.com/sDefinition/0,,sid13_gci212944,00.html, "SearchDatabase.com Definitions, Schema," printed on Dec. 9, 2002, 2 pages.

(Continued)

*Primary Examiner*—Gilberto Barron, Jr.
*Assistant Examiner*—Jenise E Jackson

(57) ABSTRACT

In accordance with an embodiment of the present invention, a web-services interface for a web-service comprises a security binding extension element operable to specify at least one security feature for a message transmitted to a service provider and a security algorithm extension element operable to specify at least one algorithm to be used for securing the message.

47 Claims, 10 Drawing Sheets

OTHER PUBLICATIONS

World Wide Web, http://searchwin2000.techtarget.com/sDefinitions/0,,sid1_gci214535,00.html, "SearchWin2000.com Definitions, Biztalk," printed on Dec. 9, 2002, 3 pages.

World Wide Web, http://searchwebservices.techtarget.com/sDefinition/0,,sid26_gci521683,00.html, SearchWebServices.com Definitions, Web Services Description Language, printed on Dec. 9, 2002, 3 pages.

World Wide Web, http://searchwebservices.techtarget.com/sDefinition/0,,sid26_gci508228,00.html, "SearchWebServices.com Definitions, UDDI," printed on Dec. 9, 2002, 3 pages.

World Wide Web, http://searchwebservices.techtarget.com/sDefinition/0,,sid26_gci214295,00.html, "SearchWebServices.com Definitions, Simple Object Access Protocol," printed on Dec. 9, 2002, 3 pages.

World Wide Web, http://www.zdnet.com/filters/printerfriendly/0,6061,2859619-92,00.html, Daniel Sholler, Apr. 9, 2002, printed on May 13, 2002, 3 pages.

World Wide Web, http://www.topxml.com/soap/articles/tk2/Christian Weyer, eYesoft, "Implementing a Web Service with Microsoft SOAP Toolkit Version 2.0," printed on Dec. 9, 2002, 9 pages.

World Wide Web, http://www.topxml.com/soapworkshop/articles/intro/default.asp, Paola Di Maio, "Introducing SOAP," Feb. 26, 2001, printed on Dec. 9, 2002, 2 pages.

World Wide Web, http://www.topxml.com/soapworkshop/articles/intro/page3.asp, Bob Luhrs, "Transports and RPC," Feb. 26, 2001, printed on Dec. 9, 2002, 3 pages.

World Wide Web, http://www.topxml.com/b2b/articles/biztalk_unleashed/7_concepts.asp, "BizTalk Concepts," printed on Dec. 9, 2002, 4 pages.

World Wide Web, http://www.topxml.com/b2b/articles/biztalk_unleashed/9_messagesanddocuments.asp, "Concepts & Architecture," printed on Dec. 9, 2002, 6 pages.

World Wide Web, http://www.w3.org/TR/wsc110/, Arindam Banerji, et al., Web Services Conversation Language (WSCL) 1.0, 2001-2002, printed on Dec. 9, 2002, 24 pages.

World Wide Web, http://msdn.microsoft.com/library/en-us/dnexc12k2/html/odc_xlb2b.asp?frame= true, Joe Futty, et al., "Using Mircrosoft Excel 2002 and Microsoft BizTalk Server to Build B2B Solutions," Oct. 2001, printed on Dec. 9, 2002.

World Wide Web, http://www.w3.org/TR/wsdl, Erik Christensen, et al., Web Services Description Language (WSDL), 1.1, Mar. 15, 2001, printed on Dec. 9, 2002, 51 pages.

World Wide Web, http://www.w3.org/2001/04/xmlenc#, Takeshi Imamura, et al., "XML Encryption Syntax and Processing," 2002, printed on Dec. 9, 2002, 51 pages.

World Wide Web, http://www.w3.org/TR/2002/REC-xmldsig-core-20020212/Overview.html, Mark Bartel, et al., "XML-Signature Syntax and Processing," Feb. 12, 2002, printed on Dec. 9, 2002, 64 pages.

World Wide Web, http://www.w3.org/TR/2001/REC-xml-c14n-20010315, John Boyer, Canonical XML Version 1.0, Mar. 15, 2001, printed on Dec. 9, 2002.

World Wide Web, http://www.w3.org/TR/SOAP/, Don Box, et al., Simple Object Access Protocol (SOAP) 1.1, May 8, 2000, printed on Dec. 9, 2002, 35 pages.

World Wide Web, http://www.microsoft.com/biztalk/techinfo/framwork20.asp, "Microsoft BizTalk Server," Apr. 18, 2001, printed on Dec. 9, 2002, 2 pages.

World Wide Web, http://www.microsoft.com/biztalk/techinfo/BizTalkFramework20.doc, Microsoft BizTalk Server, "BizTalk Framework, 2.0: Document and Message Specification," Dec. 2000, 61 pages.

* cited by examiner

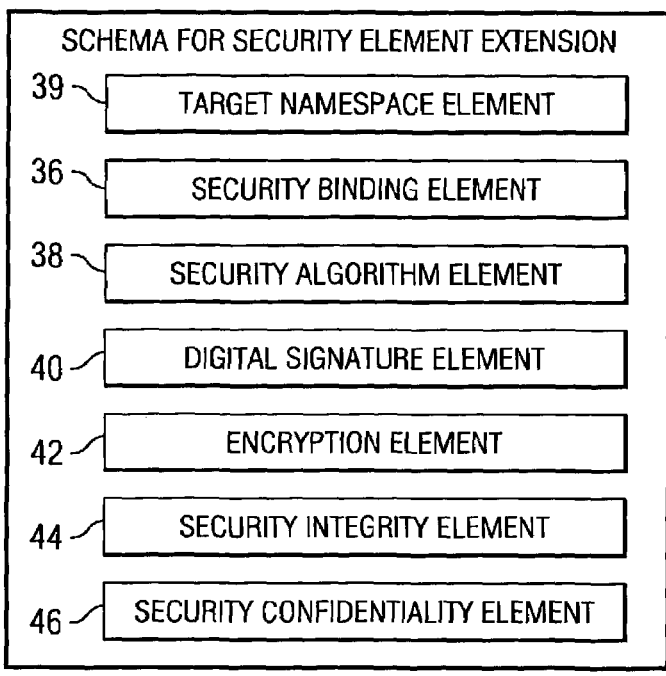
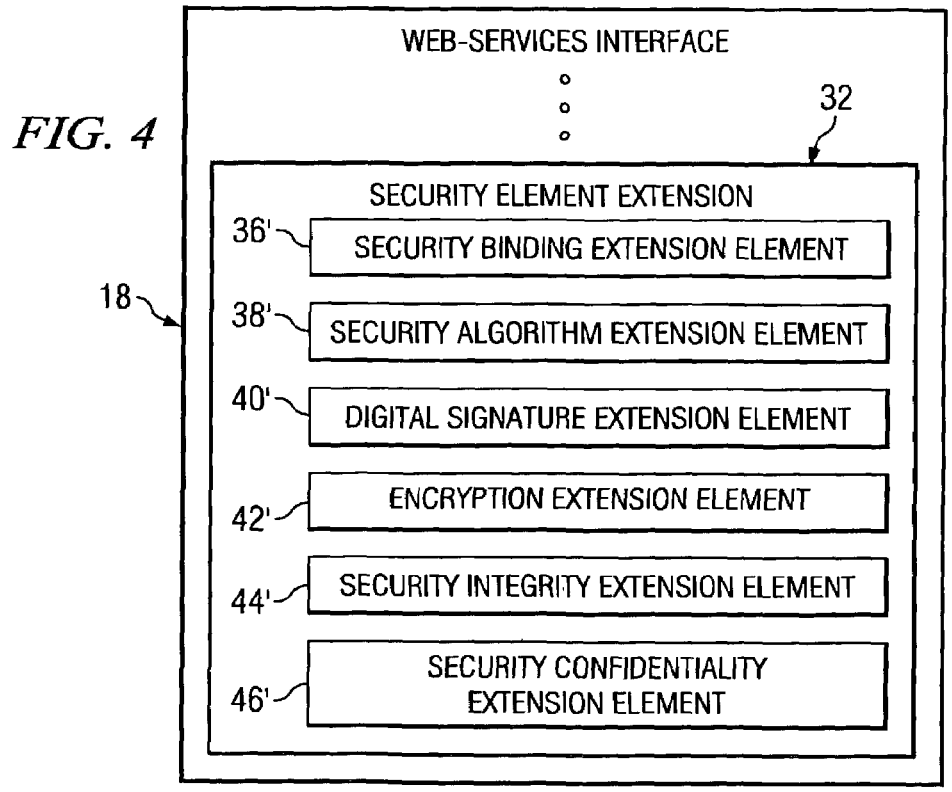

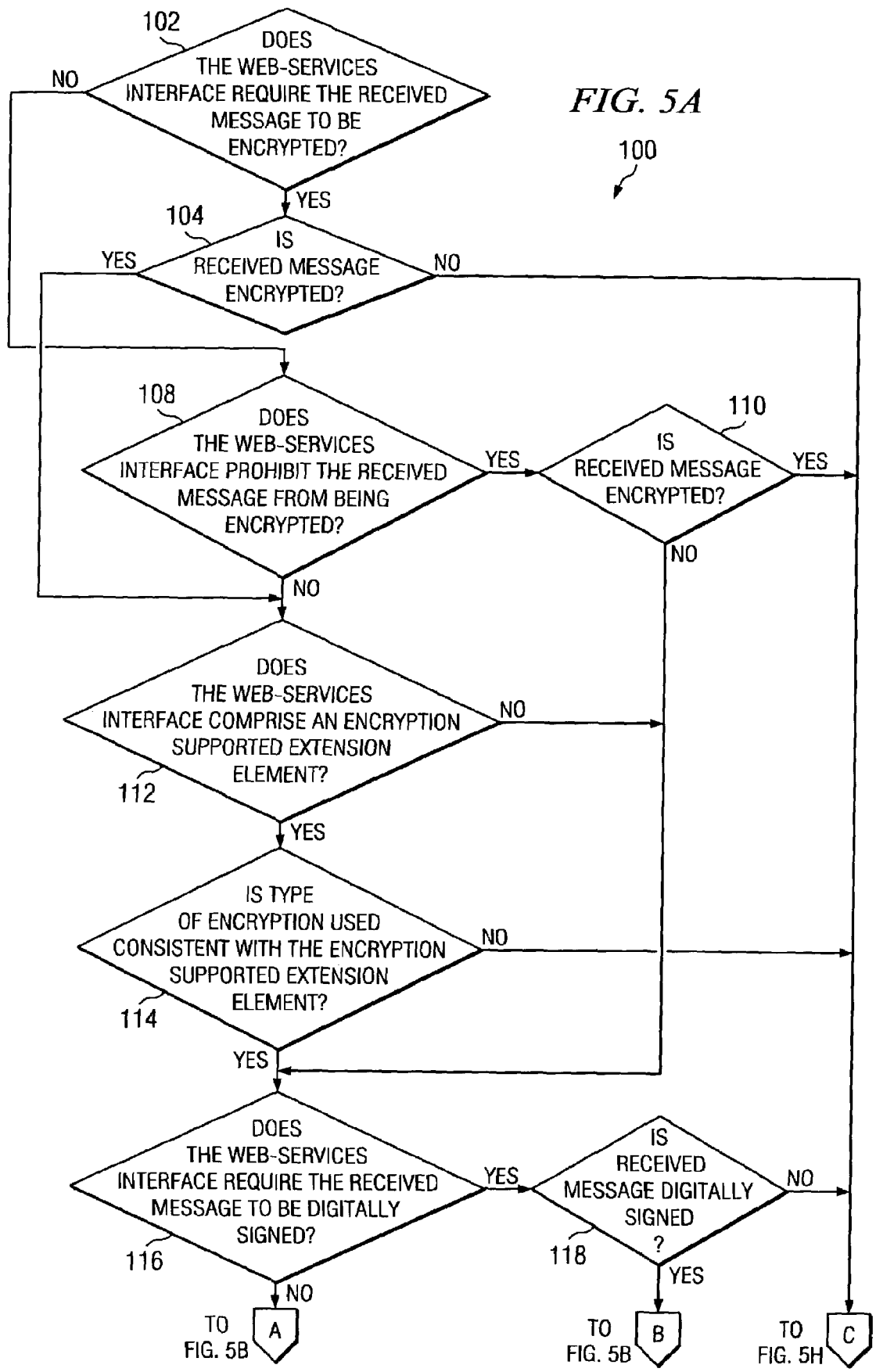

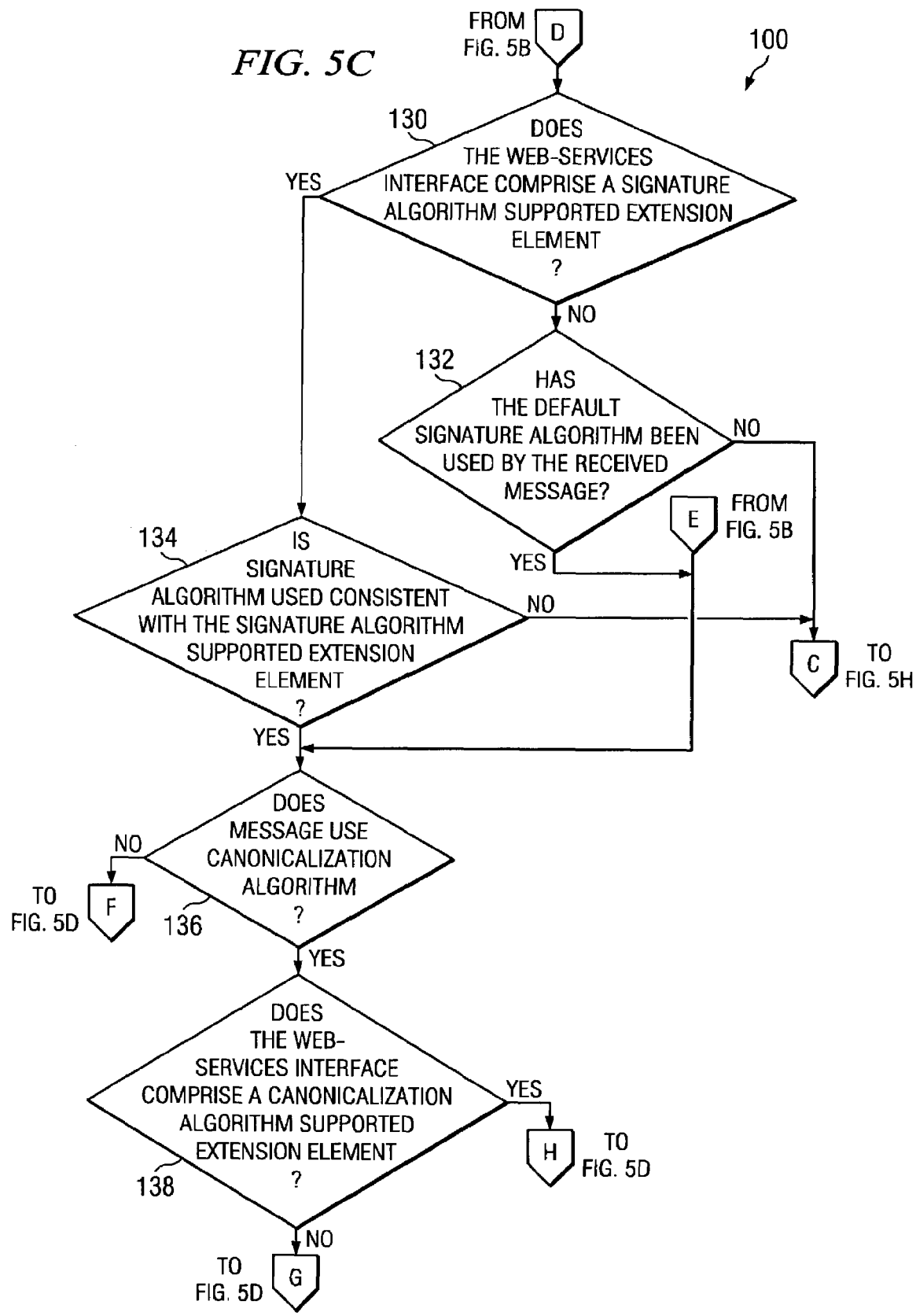

SYSTEMS AND METHODS FOR DEFINING SECURITY INFORMATION FOR WEB-SERVICES

©Hewlett-Packard Company 2001-03. A portion of the disclosure of this patent document contains material which is subject to copyright protection. The copyright owner has no objection to the facsimile reproduction by anyone of the patent document or the patent disclosure in its entirety, as it appears in the patent and trademark office patent file or records, but otherwise reserves all copyright rights whatsoever.

TECHNICAL FIELD OF THE INVENTION

The present invention relates generally to the field of web-services, and more particularly to systems and methods for defining security information for web-services.

BACKGROUND OF THE INVENTION

WSDL (Web Services Description Language) is a web-services description language that describes web-services by specifying parts, messages, operations, ports, port types and services. It comprises an XML (extensible Markup Language) vocabulary that standardizes how organizations describe web-services. A WSDL document includes various elements, which define and describe the web-services offered by the author, for example a service provider.

BizTalk Messaging Framework is a messaging framework that provides specifications for the design and development of messaging solutions for communication between applications and organizations. This specification builds upon standard and emerging Internet technologies, such as Hypertext Transfer Protocol (HTTP), Multipurpose Internet Mail Extensions (MIME), XML, and Simple Object Access Protocol (SOAP), The BizTalk Messaging Framework specifies the format of a web-services message. It defines various SOAP header elements, such as a "process" element and a "message" element.

Service requestors can access web-services remotely across the Internet using SOAP. Using WSDL, a service provider can inform service requestors on how to request information from the service provider. Service providers use WSDL to describe how their services can be used and to describe how the messages are to be built. Once the service requestor has access to the WSDL interface for a specific web-service, it uses SOAP messages to communicate with the service provider. Those messages may include SOAP header elements. The interaction between the service provider and the service requestor is achieved through message exchange. However, in some cases, defining what messages may be exchanged between the service provider and the service requestor may not be enough. For example, WSDL does not allow the service provider to specify the manner in which messages may be secured.

SUMMARY OF THE INVENTION

In accordance with an embodiment of the present invention, a web-services interface for a web-service comprises a security binding extension element operable to specify at least one security feature for a message transmitted to a service provider and a security algorithm extension element operable to specify at least one algorithm to be used for securing the message.

In accordance with another embodiment of the present invention, a method for defining a web-service comprises specifying at least one security feature for a message transmitted to a service provider and specifying at least one algorithm to be used for securing the message.

In accordance with another embodiment of the present invention, a method for providing a web-service comprises determining whether a web-services interface for the web-service requires a web-services message to be encrypted, determining whether the web-services message is encrypted in a manner specified by the web-services interface in response to the web-services interface requiring the web-services message to be encrypted, determining whether the web-services interface requires the web-services message to be digitally signed, determining whether the web-services message has been digitally signed in a manner specified by the web-services interface in response to the web-services interface requiring the web-services message to be digitally signed and processing the web-services message in response to the web-services message being secured in a manner specified by the web-services interface.

BRIEF DESCRIPTION OF THE DRAWINGS

For a more complete understanding of the present invention, the objects and advantages thereof, reference is now made to the following descriptions taken in connection with the accompanying drawings in which:

FIG. 3 is a diagram of a schema for a security element extension in accordance with an embodiment of the present invention;

FIG. 4 is a diagram of a portion of an exemplary web-services interface that comprises a security element extension in accordance with an embodiment of the present invention; and FIGS. 5A-5H illustrate a flowchart of an exemplary method for processing, in accordance with an embodiment of the present invention, a message received by the service provider.

DETAILED DESCRIPTION OF THE DRAWINGS

The preferred embodiment of the present invention and its advantages are best understood by referring to FIGS. 1 through 5H of the drawings, like numerals being used for like and corresponding parts of the various drawings.

A web-services interface, for example a Web Services Description Language (WSDL) document, describes at least one web-service provided by a service provider. The WSDL document may also provide information on the types of messages that may be exchanged between the service provider and a service requestor. However, WSDL does not provide a mechanism for the service provider to specify that it expects messages from the service requestor to be secured, for example by encryption, digital signatures, and/or the like. Furthermore, WSDL does not provide a mechanism for the service provider to indicate that messages transmitted by the service provider might be secured. With the increase in the incidents of hacking and other unauthorized access to data, especially business data, it is desirable that the service provider be able to specify that messages received from the service requestor be secured. Furthermore, it is desirable that the service provider be able to specify the manner of securing the messages. Thus, there is a desire for a system and method for defining security information for web-services, which defines or specifies the security features to be used in securing web-services messages.

Accordingly, a schema is provided which may be used by the service provider to define at least part of one or more web-services. The definition of the web-service preferably comprises a security element extension, which defines or specifies the security features to be used in securing messages between the service provider and the service requestor. The messages may be web-services messages that are in accordance with an asynchronous messaging framework, such as BizTalk Messaging Framework or Simple Object Access Protocol (SOAP).

Preferably, a service provider publishes a web-services interface which defines the desired security features. A service requestor examines the web-services interface to determine the manner in which to secure messages transmitted to the service provider. If desired, the service requestor may also determine whether messages received from the service provider are secured and, if so, the manner in which the messages are secured. When a service provider receives a message, such as a web-services document, for example an XML (extensible Markup Language) document, it can determine whether the message is secured in a manner defined or specified by the service provider. If the received message complies with the defined security features, then the service provider processes the message appropriately. Otherwise, the service provider may ignore the received message and may transmit an error message to the service requestor.

Figure 1:
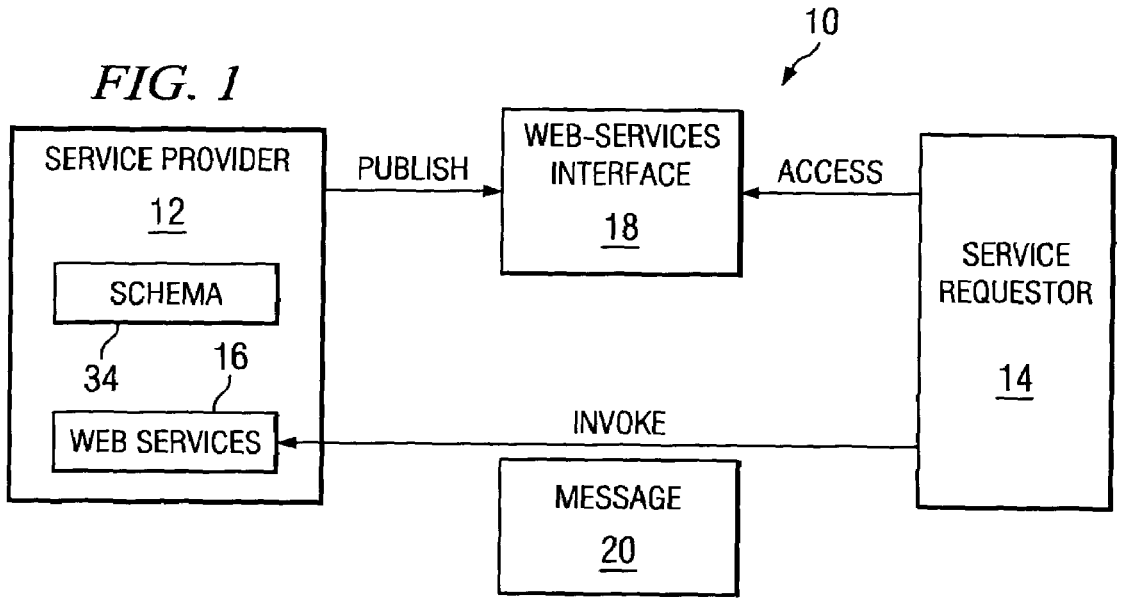
FIG. 1 is a logical block diagram of a system which may use embodiments of the present invention to advantage.

FIG. 1 is a logical block diagram of a system 10 which may use embodiments of the present invention to advantage. System 10 comprises a service provider 12 and a service requestor 14. Service provider 12 is a provider of at least one web-service 16. Service provider 12 publishes at least one web-services interface 18 based at least in part on a schema 34 (FIG. 3). Web-services interface 18 preferably comprises a WSDL interface, for example a WSDL document. Web-services interface 18 defines the web-services that service provider 12 is capable of providing and preferably comprises a security element extension 32 (FIG. 4) generated in accordance with schema 34 of FIG. 3. Service requestor 14 requests at least one web-service 16 by transmitting a message 20 to service provider 12. Web-services interface 18 defines or specifies the security features for message 20.

Figure 2:
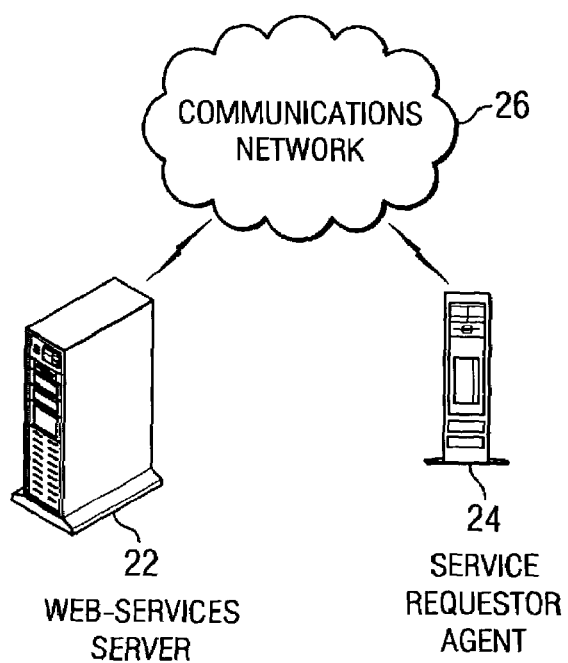
FIG. 2 is a high level block diagram of a system which may use embodiments of the present invention to advantage.
Figure 5B:
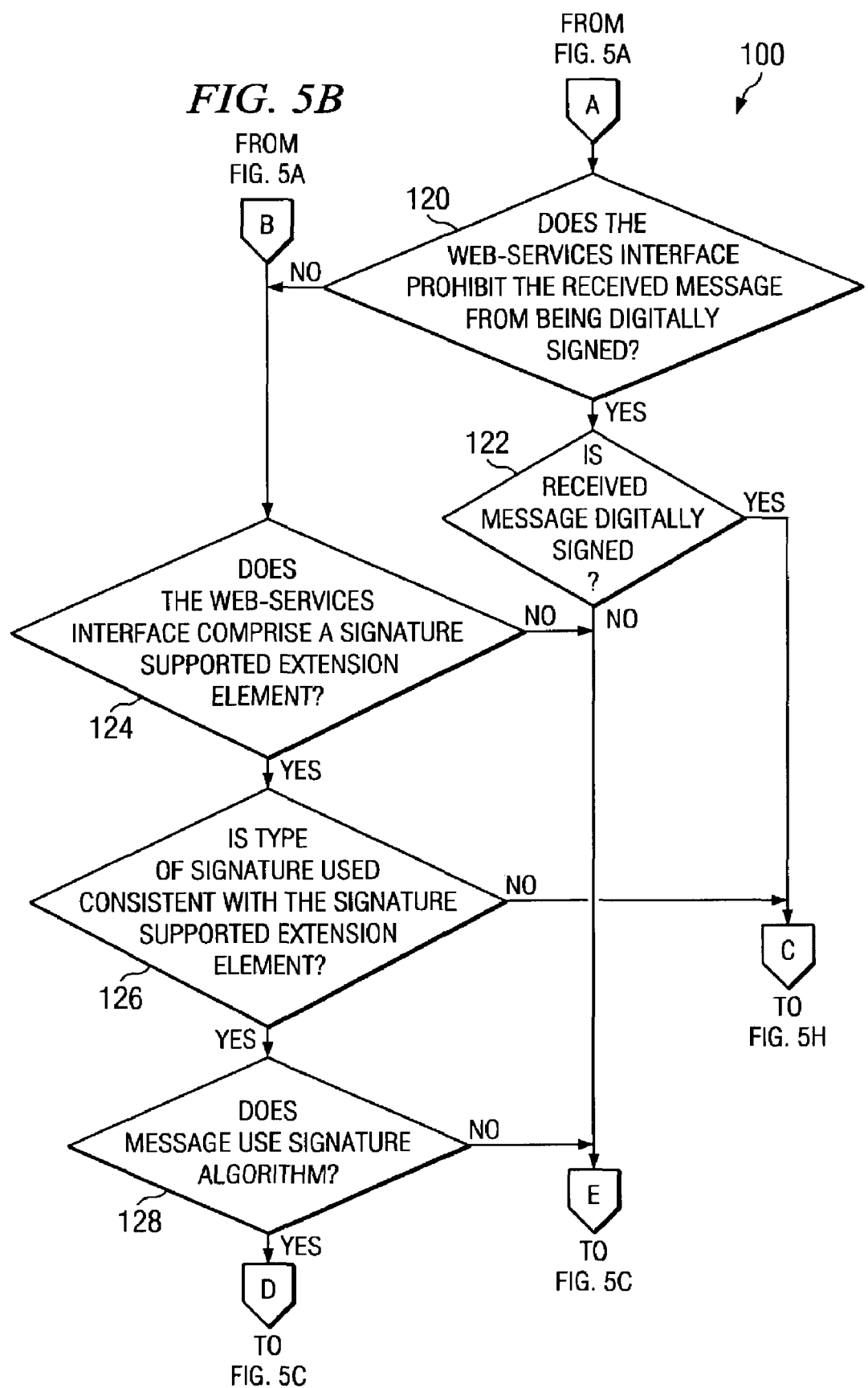
Figure 5D:
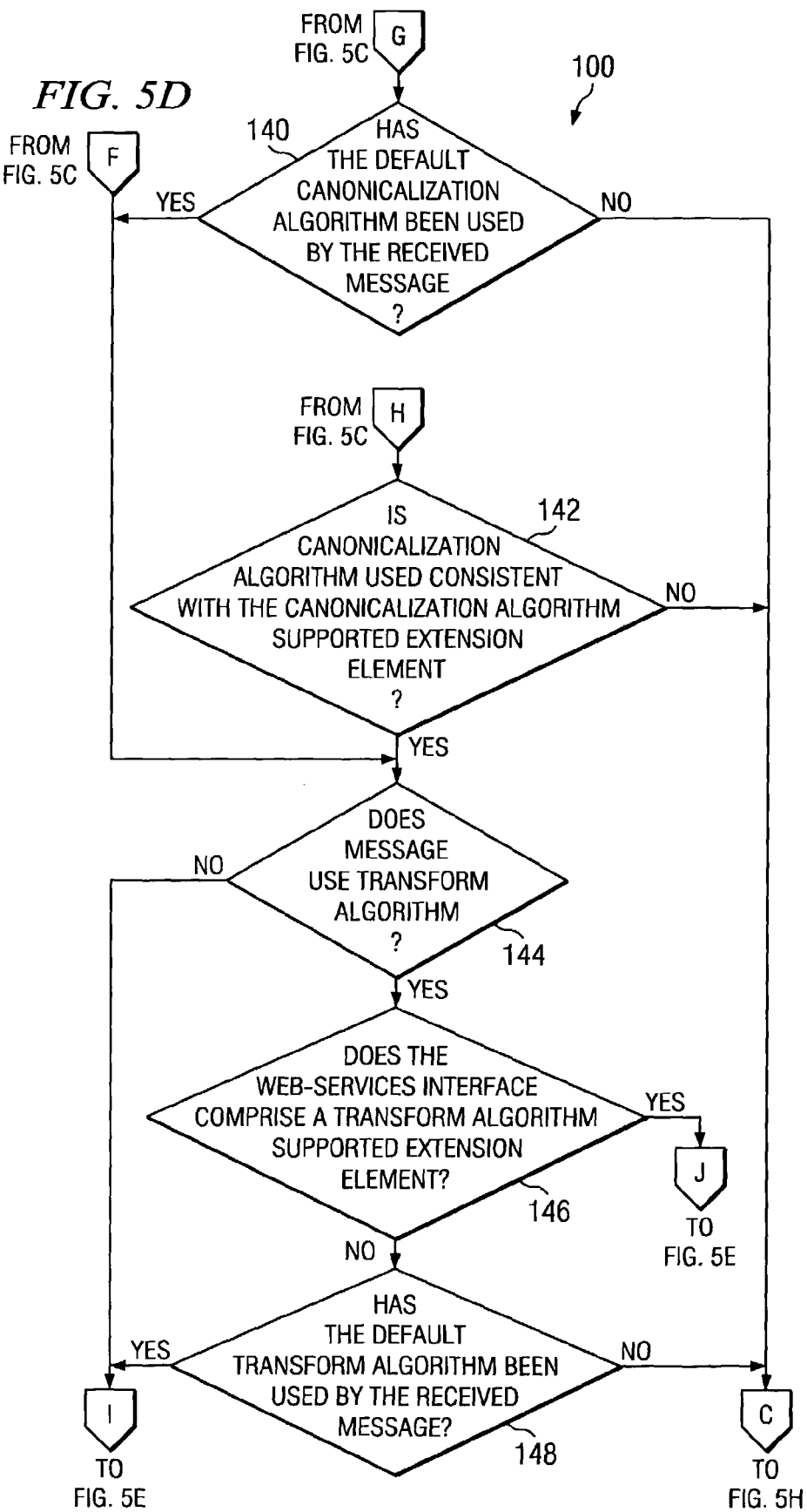
Figure 5E:
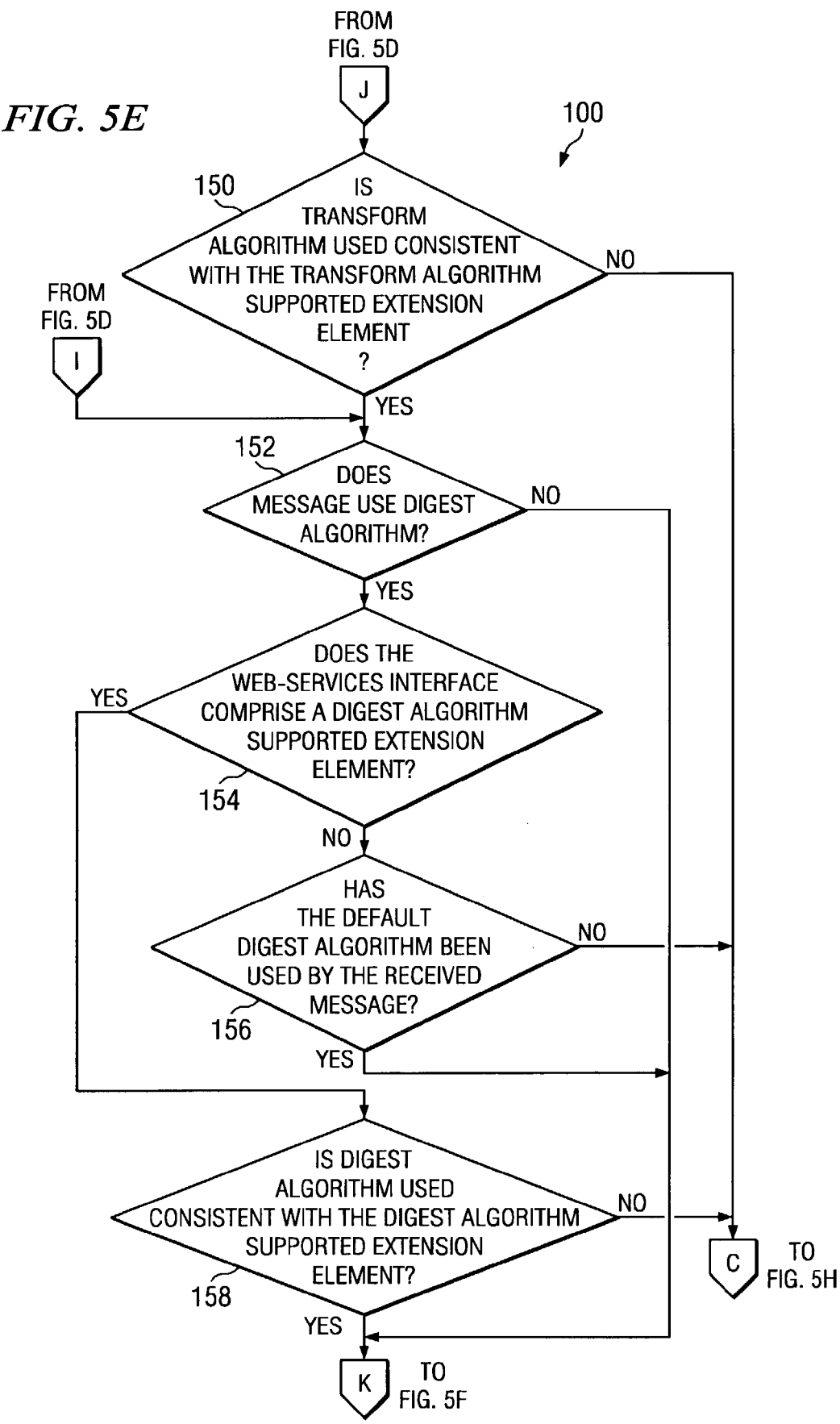
Figure 5F:
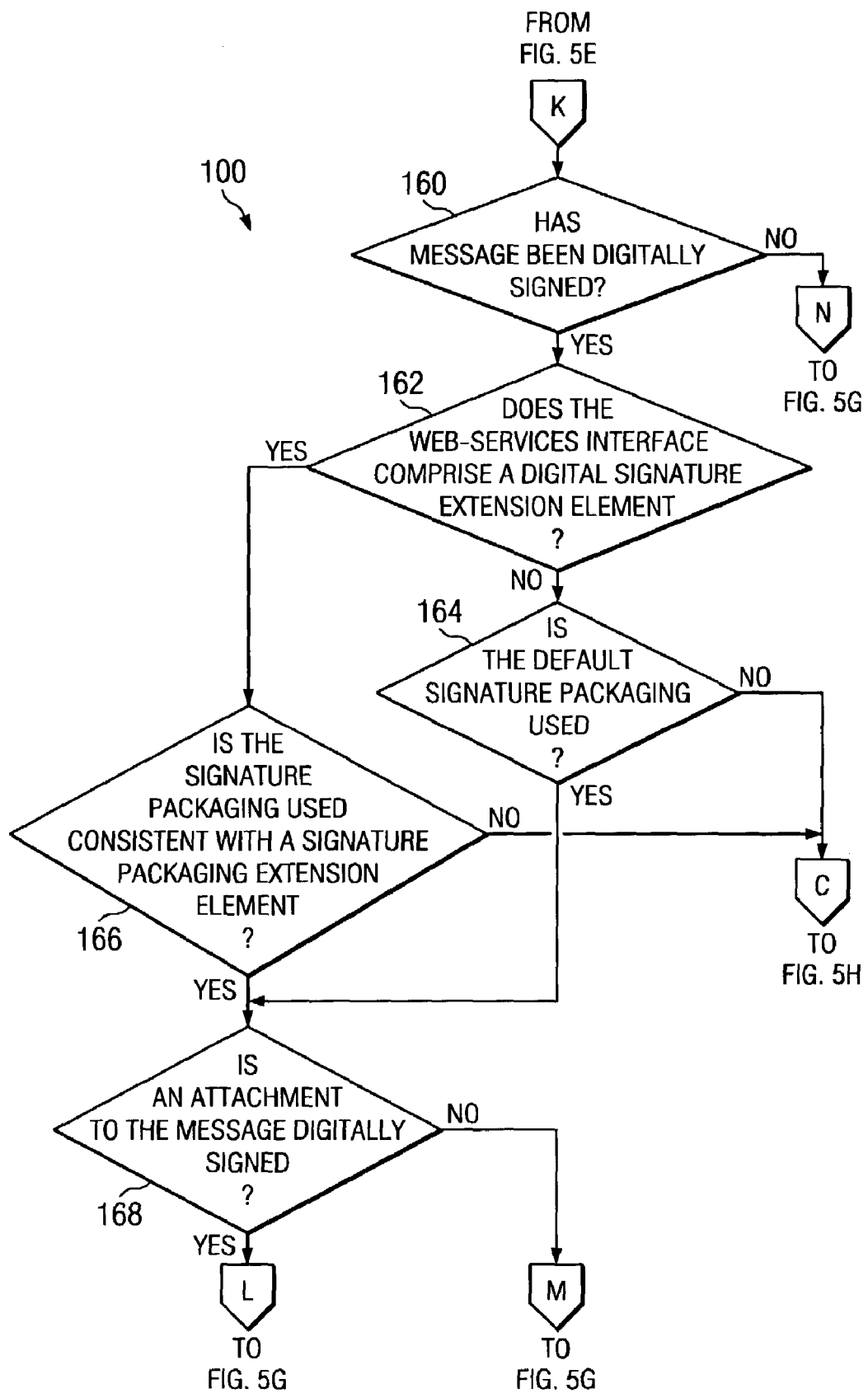
Figure 5G:
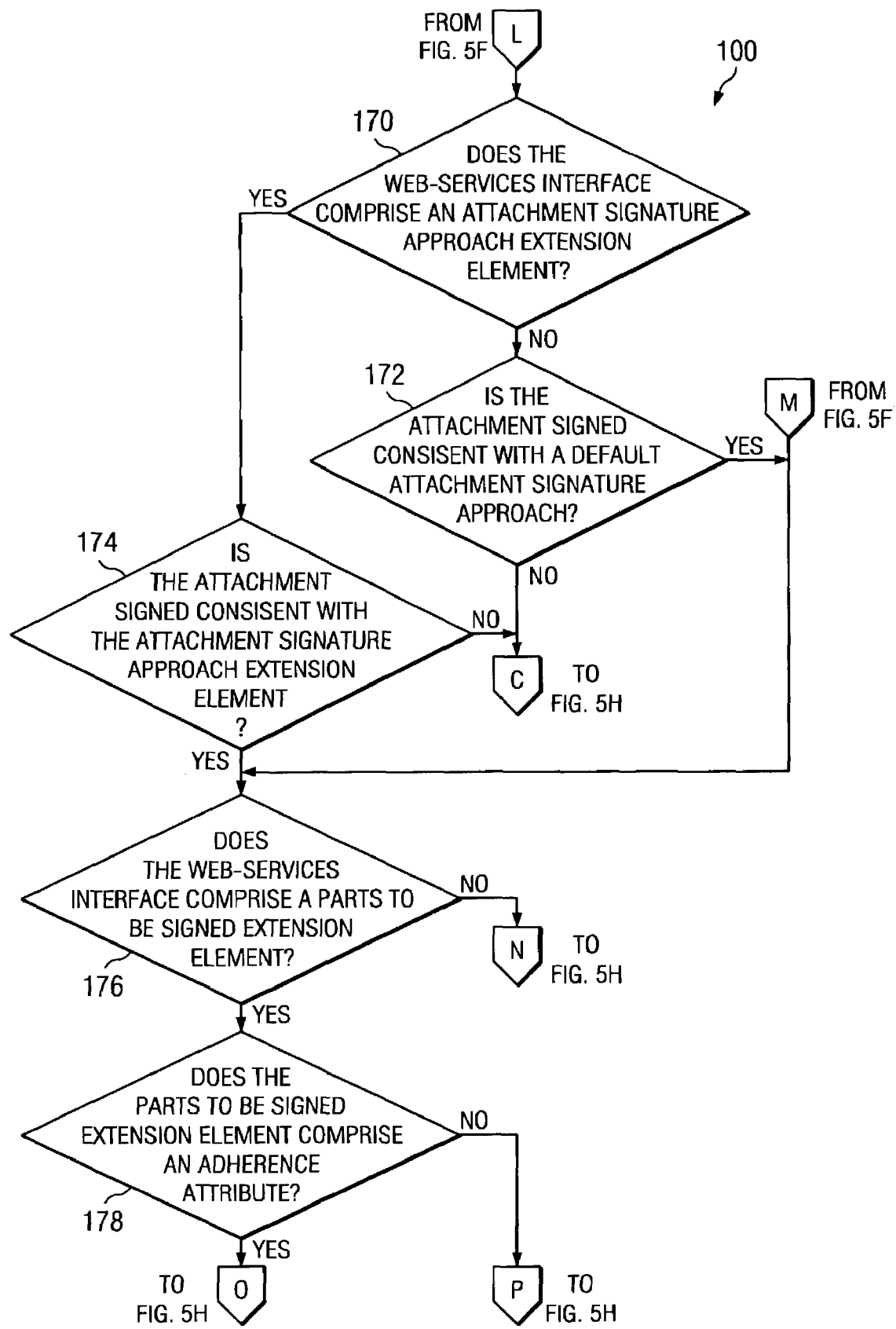
Figure 5H:
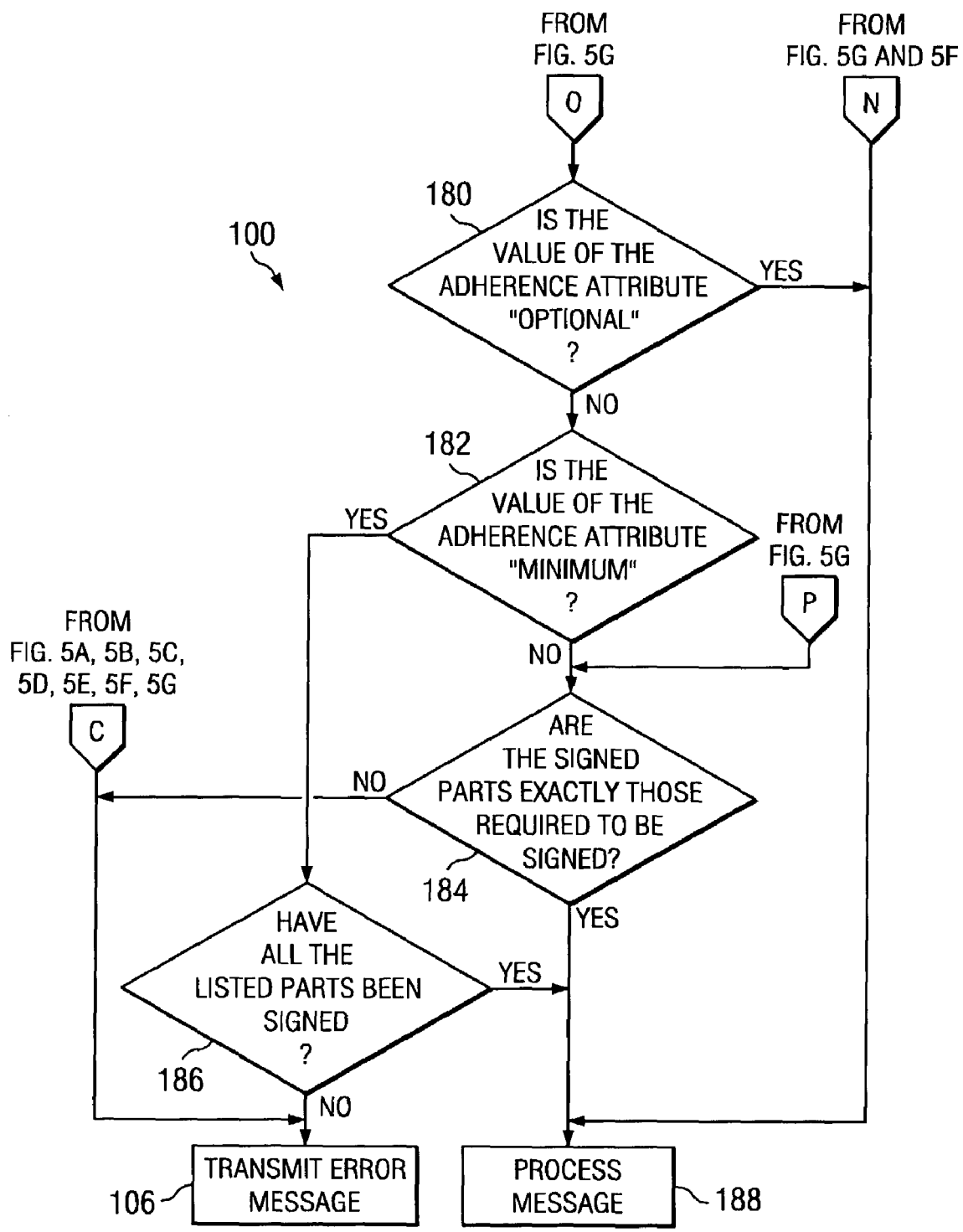

Referring also to FIG. 2, in an exemplary embodiment, a web-services server 22 is communicatively coupled with a service requestor agent 24. Web-services server 22 may be provided by service provider 12. Web-services server 22 is capable of providing web-services 16. Web-services server 22 may comprise a plurality of ports (not shown) corresponding to one or more operations of the web-service. Service requestor 14 utilizes service requestor agent 24 to request web-services from web-services server 22 and/or invoke operations on web-services server 22 via a communications network 26. Schema 34 of FIG. 3 provides guidance for creating a web-services interface which preferably specifies the security features to be used for messages invoking the web-service. Thus, schema 34 provides guidance to service provider 12 for creating a web-services interface which in turn provides guidance to service requestor 14 desiring to invoke the web-service.

FIG. 3 is a diagram of schema 34 for security element extension 32 in accordance with an embodiment of the present invention. FIG. 4 is a diagram of a portion of an exemplary web-services interface 18 that comprises security element extension 32 in accordance with an embodiment of the present invention. Web-services interface 18 is an exemplary web-services interface generated by service provider 12 and made available to service requestor 14. Preferably, web-services interface 18 is a WSDL document. Security element extension 32 complies with schema 34 of FIG. 3. Service provider 12 defines additional information about a web-service in security element extension 32 and informs service requestor 14 about the security features desired and/or supported by service provider 12. An exemplary schema is provided in APPENDIX A. A portion of exemplary web-services interface 18 in accordance with schema 34 is provided in APPENDIX B. Schema 34 comprises a plurality of elements and web-services interface 18 comprises a plurality of extension elements in accordance with the elements of schema 34. These elements are discussed in detail hereinafter.

In general, an extension element may be specified in pre-defined locations in a WSDL document, for example binding, binding/operation and the sub-elements of binding/operation. The extension elements apply to the specified element and all its sub-elements, unless a sub-element has its own details element. If a sub-element has its own details element, then the specifications of the sub-element override conflicting specifications of the parent element. For example, if details are specified at the port level, then they preferably apply to all messages and/or operations for the specified port, unless the individual messages and/or operations have conflicting details, in which case the details at the lower level override conflicting details at the higher level. An extension element may have a default details value. Thus, if the details elements are omitted, then the default values may be used, if applicable.

An element of the schema may have a documentation sub-element within an annotation element. A documentation sub-element specifies the function of the element to which it belongs in human-readable form so that an actor, for example a service provider, may understand the format in which a web-services interface conforming to the schema may be built. For example, the example in APPENDIX A comprises the following annotation element:

```
<xsd:annotation>
  <xsd:documentation>Provides details about how to apply an XML
  digital signature to the messages exchanged.</xsd:documentation>
</xsd:annotation>
```

Schema 34 comprises a target namespace element 39. The following is an exemplary definition for target namespace element 39:

```
<xsd:schema targetNamespace="http://schemas.hp-
    .com/web-services/wsdl/security" xmlns:
    sec="http://schemas.hp.com/web-services/wsdl/
    security" . . . >
```

Target namespace element 39 preferably defines an identifier that uniquely references an extension to a specification, for example a security element extension to a specification of a web-services description language. An example of the identifier is a Uniform Resource Locator (URL), for example, http://schemas.hp.com/web-services/wsdl/security. The identifier (not separately shown) specified in a namespace element of exemplary web-services interface 18 of FIG. 4 preferably corresponds to the identifier defined in target namespace element 39 (FIG. 3).

Target namespace element 39 also specifies that an element of a security element extension 32 of exemplary web-services interface 18 starts with a particular string, such as "sec".

Schema 34 comprises a security binding element 36. Security binding element 36 informs service requestor 14 about the types of encryption and/or digital signatures supported and/or used by service provider 12, The following is an exemplary definition for security binding element 36:

```
<xsd:element name="securityBinding" type="sec:
    securityBindingType"/>
```

According to the above example, security binding element 36 is of type securityBindingType. In the example in APPENDIX A, a security binding definition element is used to define an element of type securityBindingType. The following is an example of the security binding definition element:

```
<xsd:complexType name="securityBindingType">
    ...
</xsd:complexType>
```

The security binding definition element comprises a security binding sequence sub-element. The following is an exemplary definition for the security binding sequence sub-element:

```
<xsd:sequence>
    <xsd:element   name="encryptionSupported"   type="xsd:anyURI"
        minOccurs="0" maxOccurs="unbounded"/>
    <xsd:element name="signatureSupported" type="xsd:anyURI"
        minOccurs="0"
        maxOccurs="unbounded"/>
    <xsd:element name="encryptionUsed" type="xsd:anyURI"
        minOccurs="0"/>
    <xsd:element name="signatureUsed" type="xsd:anyURI"
        minOccurs="0"/>
</xsd:sequence>
```

The security binding sequence sub-element preferably provides a list of elements which comprise security binding element 36 and which, according to schema 34, are to be defined in a security binding extension element 36' of web-services interface 18. If no security binding extension element 36' is specified in web-services interface 18 or if some elements, sub-elements, and/or attributes are omitted, then preferably default values apply.

Security binding element 36 comprises a plurality of elements, such as an encryption supported element, a signature supported element, an encryption used element and a signature used element, for example encryptionSupported, signatureSupported, encryptionUsed, and signatureUsed, as listed in the above sequence sub-element. An element listed in the sequence sub-element may be further defined. The following is an exemplary definition for the encryption supported element:

```
<xsd:element name="encryptionSupported"
    type="xsd:anyURI" minOccurs="0"
    maxOccurs="unbounded"/>
```

According to the above example, an encryption supported extension element of security binding extension element 36' of web-services interface 18 of FIG. 4 preferably specifies the encryptions that service provider 12 supports for received messages. The encryption supported element is of type anyURI, which indicates that any Uniform Resource Identifier (URI) for encryption may be specified. The encryption supported element has a minimum occurrence (minOccurs) value of zero and a maximum occurrence (maxOccurs) value of "unbounded", which indicates that the encryption supported extension element may appear zero or more times in security binding extension element 36' of web-services interface 18. The encryption supported extension element may have a default value, for example XML Encryption. The specification for XML Encryption is referenced by the URI http://www.w3.org/2001/04/xmlenc#.

The following is an exemplary definition for the signature supported element:

```
<xsd:element name="signatureSupported" type="xsd:
    anyURI" minOccurs="0"
    maxOccurs="unbounded"/>
```

According to the above example, a signature supported extension element of security binding extension element 36' of web-services interface 18 preferably specifics the digital signatures that service provider 12 supports for received messages. The signature supported element is of type anyURI, which indicates that any URI for digital signature may be specified. The signature supported element has a minimum occurrence (minOccurs) value of zero and a maximum occurrence (maxOccurs) value of "unbounded", which indicates that the signature supported extension element may appear zero or more times in security binding extension element 36' of web-services interface 18. The signature supported extension element may have a default value, for example XML Digital Signature. The specification for XML Digital Signature is referenced by the URI http://www.w3.org/2000/09/xmldsig, and is incorporated herein by reference.

The following is an exemplary definition for the encryption used element:

```
<xsd:element name="encryptionUsed" type="xsd:
    anyURI" minOccurs="0"/>
```

According to the above example, an encryption used extension element of security binding extension element 36' of web-services interface 18 preferably specifies the encryption that service provider 12 uses when sending out messages. The encryption used element is of type anyURI, which indicates that any URI for encryption may be specified. The encryption used element has a minimum occurrence (minOccurs) value of zero, which indicates that the encryption used extension element is optional in security binding extension element 36' of web-services interface 18. The encryption used extension element may have a default value, for example XML Encryption.

The following is an exemplary definition for the signature used element:

```
<xsd:element name="signatureUsed" type="xsd:
    anyURI" minOccurs="0"/>
```

According to the above example, a signature used extension element of security binding extension element 36' of web-services interface 18 preferably specifies the digital signature that service provider 12 uses when sending out messages. The signature used element is of type anyURI, which indicates that any URI for digital signature may be specified. The signature used element has a minimum occurrence (minOccurs) value of zero, which indicates that the signatureused extension element is optional in security binding extension element 36' of web-services interface 18. The signature used extension element may have a default value, for example XML Digital Signature.

According to schema 34, security binding element 36 also comprises an encryption attribute and a signature attribute, each of the type requirementsType. The following is an exemplary definition for the encryption attribute and the signature attribute:

```
<xsd:attribute name="encryption" type="sec:require-
    mentsType" use="optional" default="optional"/>

<xsd:attribute name="signature" type="sec:require-
    mentsType" use="optional" default="optional"/>
```

These attributes denote whether encryption and/or digital signatures are required ("required"), optional ("optional"), or not allowed ("none"). Preferably, the default value for each of the attributes is "optional", i.e. it is up to the sender of the message to decide whether the message should be encrypted or digitally signed. If web-services interface 18 defines the value of the encryption attribute to be "optional" or "required", then it is desirable that the encryption supported extension element be defined in security binding extension element 36' of web-services interface 18 to indicate to service requestor 14 what types of encryption are supported. If the value of the encryption attribute is "none", then the encryption supported extension element may be omitted from web-services interface 18. If web-services interface 18 defines the value of the signature attribute to be "optional" or "required", then it is desirable that the signature supported extension element be defined in security binding extension element 36' of web-service interface 18 to indicate to service requestor 14 what types of digital signatures are supported. If the value of signature attributed is "none", then the signature supported extension element may be omitted from web-services interface 18.

A requirements type element is used to define an element of type requirementsType. The following is an exemplary definition for the requirements type element:

```
<xsd:simpleType name="requirementsType">
    <xsd:annotation>
        <xsd:documentation>Specifies the possible values for attributes like
        encryption and signature.</xsd:documentation>
    </xsd:annotation>
    <xsd:restriction base="xsd:NMTOKEN">
        <xsd:enumeration value="none"/>
```

-continued

```
        <xsd:enumeration value="optional"/>
        <xsd:enumeration value="required"/>
    </xsd:restriction>
</xsd:simpleType>
```

According to the above example, the requirements type element specifics the possible values for attributes, such as the encryption attribute and the signature attribute. The requirements type element comprises a restriction base element of type NMTOKEN. NMTOKEN is preferably a name token comprising of one or more characters, such as alphabets, digits, hyphens, underscores and/or periods. The requirements type element restricts the name tokens that may be used by defining enumeration values. In the above example, the possible enumeration values are "none", "optional" and "required".

Schema 34 comprises a security algorithm element 38. Security algorithm element 38 informs service requestor 14 about the algorithms to be used for security, The following is an exemplary definition for security algorithm element 38:

```
<xsd:element name="securityAlgorithmDetails"
    type="sec:securityAlgorithmDetail sType"/>
```

According to the above example, security algorithm element 38 is of type securityAlgorithmDetailsType. In the example in APPENDIX A, a security algorithm definition element is used to define an element of type securityAlgorithmDetailsType. The following is an example of the security algorithm definition element:

```
<xsd:complexType name="securityAlgorithmDetailsType">
    ...
</xsd:complexType>
```

The security algorithm definition element comprises a security algorithm sequence sub-element. The following is an exemplary definition for the security algorithm sequence sub-element:

```
<xsd:sequence>
    <xsd:element name="signatureAlgorithmSupported" type="xsd:anyURI" mi
        nOccurs="0" maxOccurs="unbounded"/>
    <xsd:element name="canonicalizationAlgorithmSupported" type="xsd:anyURI"
        minOccurs="0" maxOccurs="unbounded"/>
    <xsd.element name="transformAlgorithmSupported" type="xsd:anyURI" minO
        ccurs="0" maxOccurs="unbounded"/>
    <xsd:element name="digestAlgorithmSupported" type="xsd:anyURI"
        minOccurs="0" maxOccurs="unbounded"/>
    <xsd:element name="signatureAlgorithmUsed" type="xsd:anyURI"
        minOccurs="0"/>
    <xsd:element name="canonicalizationAlgorithmUsed" type="xsd:anyURI"
        minOccurs="0"/>
    <xsd:element   name="transformAlgorithmUsed"   type="xsd:anyURI"
        minOccurs="0"/>
    <xsd:element   name="digestAlgorithmUsed"          type="xsd:anyURI"
        minOccurs="0"/>
</xsd:sequence>
```

The security algorithm sequence sub-element preferably provides a list of elements which comprise security algorithm element 38 and which, according to schema 34, are to be defined in a security algorithm extension element 38' of web-services interface 18. If no security algorithm extension element 38' is specified in web-services interface 18 or if some elements, sub-elements, and/or attributes are omitted, then preferably default values apply.

Security algorithm element 38 comprises a plurality of elements, such as a signature algorithm supported element, a canonicalization algorithm supported element, a transform algorithm supported element, a digest algorithm supported element, a signature algorithm used element, a canonicalization algorithm used element, a transform algorithm used element, and a digest algorithm used element, for example signatureAlgorithmSupported, canonicalizationAlgorithmSupported, transformAlgorithmSupported, digestAlgorithmSupported, signatureAlgorithmUsed, canonicalizationAlgorithmUsed, transformAlgorithmUsed and digestAlgorithmUsed, as listed in the above sequence sub-element.

The following is an exemplary definition for the signature algorithm supported element:

```
<xsd:element name="signatureAlgorithmSupported"
    type="xsd:anyURI" minOccurs="0"
    maxOccurs="unbounded"/>
```

According to the above example, a signature algorithm supported extension element of security algorithm extension element 38' of web-services interface 18 of FIG. 4 preferably specifies the signature algorithms that service provider 12 supports for received messages. The signature algorithm supported element is of type anyURI, which indicates that any URI referencing a signature algorithm may be specified. The signature algorithm supported element has a minimum occurrence (minOccurs) value of zero and a maximum occurrence (maxOccurs) value of "unbounded", which indicates that the signature algorithm supported extension element may appear zero or more times in security algorithm extension element 38' of web-services interface 18. Any of the listed algorithms may be used by service requestor 14 to sign the message transmitted by service requestor 14 to service provider 12. The signature algorithm supported element may have a default value, for example http://www.w3.org/2000/09/xmldsig#dsa-sha1.

The following is an exemplary definition for the canonicalization algorithm supported element:

```
<xsd:element
    name="canonicalizationAlgorithmSupported"
    type="xsd:anyURI" minOccurs="0"
    maxOccurs="unbounded"/>
```

According to the above example, a canonicalization algorithm supported extension element of security algorithm extension element 38' of web-service interface 18 preferably specifies the canonicalization algorithms that service provider 12 supports. A canonicalization algorithm comprises an algorithm to standardize the XML representation of an object such that two semantically equivalent objects have the same XML representation. The canonicalization algorithm supported element is of type anyURI, which indicates that any URI referencing a canonicalization algorithm may be specified. The canonicalization algorithm supported element may have a default value, for example http://www.w3.org/TR/2001/REC-xml-c14n-20010315. The canonicalization algorithm supported element has a minimum occurrence (minOccurs) value of zero and a maximum occurrence (maxOccurs) value of "unbounded", which indicates that the canonicalization algorithm supported extension element may appear zero or more times.

The following is an exemplary definition for the transform algorithm supported element:

```
<xsd:element name="transformAlgorithmSupported"
    type="xsd:anyURI" minOccurs="0"
    maxOccurs="unbounded"/>
```

According to the above example, a transform algorithm supported extension element of security algorithm extension element 38' of web-service interface 18 preferably specifies the transform algorithms that service provider 12 supports. The transform algorithm supported element is of type anyURI, which indicates that any URI referencing a transform algorithm may be specified. The transform algorithm supported element has a minimum occurrence (minOccurs) value of zero and a maximum occurrence (maxOccurs) value of "unbounded", which indicates that the transform algorithm supported extension element may appear zero or more times in security algorithm extension element 38' of web-services interface 18. Any of the listed algorithms may be used by service requestor 14 on the message before it is digitally signed or encrypted. The transform algorithm supported element may have a default value, for example http://www.w3.org/2000/09/xmldsig#enveloped-signature.

The following is an exemplary definition for the digest algorithm supported element:

```
<xsd:element name="digestAlgorithmSupported"
    type="xsd:anyURI" minOccurs="0"
    maxOccurs="unbounded"/>
```

According to the above example, a digest algorithm supported extension element of security algorithm extension element 38' of web-service interface 18 preferably specifies the digest algorithms that service provider 12 supports. In general, a digest algorithm may be used to create a string which represents the message being sent to either service provider 12 or service requestor 14. The string may then be used to determine whether the message has been changed or not. The digest algorithm supported element is of type anyURI, which indicates that any URI referencing a digest algorithm may be specified. The digest algorithm supported element has a minimum occurrence (minOccurs) value of zero and a maximum occurrence (maxOccurs) value of "unbounded", which indicates that the digest algorithm supported extension element may appear zero or more times in security algorithm extension element 38' of web-services interface 18. Any of the listed algorithms may be used by service requestor 14 to create a string for the message being transmitted to service provider 12. The digest algorithm supported element may have a default value, for example http://www.w3.org/2000/09/xmldsig#sha1.

The following is an exemplary definition for the signature algorithm used element:

```
<xsd:element name="signatureAlgorithmUsed"
    type="xsd:anyURI" minOccurs="0"/>
```

According to the above example, a signature algorithm used extension element of security algorithm extension element 38' of web-services interface 18 preferably specifies the signature algorithm that service provider 12 uses when sending messages. The listed algorithm may be used by service provider 12 to sign the message transmitted by service provider 12. The signature algorithm used element is of type anyURI, which indicates that any URI referencing a digital signature algorithm may be specified. The signature algorithm used element has a minimum occurrence (minOccurs)

value of zero, which indicates that the signature algorithm used extension element is optional in security algorithm extension element 38' of web-services interface 18. The signature algorithm used element may have a default value, for example http://www.w3.org/2000/09/xmldsig#dsa-sha1.

The following is an exemplary definition for the canonicalization algorithm used element:

```
<xsd:element
    name="canonicalizationAlgorithmUsed"
    type="xsd:anyURI" minOccurs="0"/>
```

According to the above example, a canonicalization algorithm used extension element of security algorithm extension element 38' of web-services 18 preferably specifics the canonicalization algorithm used by service provider 12 when sending messages. The canonicalization algorithm used element is of type anyURI, which indicates that any URI referencing a canonicalization algorithm may be specified. The canonicalization algorithm used element has a minimum occurrence (minOccurs) value of zero, which indicates that the canonicalization algorithm used extension element is optional in security algorithm extension element 38' of web-services interface 18. The canonicalization algorithm used element may have a default value, for example http://www.w3.org/TR/2001/REC-xml-c14n-20010315.

The following is an exemplary definition for the transform algorithm used element:

```
<xsd:element name="transformAlgorithmUsed"
    type="xsd:anyURI" minOccurs="0"/>
```

According to the above example, a transform algorithm used extension element of security algorithm extension element 38' of web-services interface 18 preferably specifies the transform algorithm used by service provider 12 before sending messages. The listed algorithm may be used by service provider 12 to transform the message before it is digitally signed or encrypted by service provider 12. The transform algorithm used element is of type anyURI, which indicates that any URI referencing a transform algorithm may be specified. The transform algorithm supported element has a minimum occurrence (minOccurs) value of zero, which indicates that transform algorithm used extension element is optional in security algorithm extension element 38' of web-services interface 18. The transform algorithm used element may have a default value, for example http://www.w3.org/2000/09/xmldsig#enveloped-signature.

The following is an exemplary definition for the digest algorithm used element:

```
<xsd:element name="digestAlgorithmUsed"
    type="xsd:anyURI" minOccurs="0"/>
```

According to the above example, a digest algorithm used extension element of security algorithm extension element 38' of web-services interface 18 preferably specifies the digest algorithm used by service provider 12 on messages. The listed algorithm may be used by service provider 12 to create a string for the message being transmitted by service provider 12. The digest algorithm used element is of type anyURI, which indicates that any URI referencing a digest algorithm may be specified. The digest algorithm used element has a minimum occurrence (minOccurs) value of zero, which indicates that the digest algorithm used extension element is optional in security algorithm extension element 38' of web-services interface 18, The digest algorithm used element may have a default value, for example http://www.w3.org/2000/09/xmldsig#sha1.

Schema 34 comprises a digital signature element 40. The following is an exemplary definition for digital signature element 40:

```
<xsd:element name="xmlDigSigDetails"
type="sec:xmlDigSigDetailsType">
    <xsd:annotation>
        <xsd:documentation>Provides details about how to apply a digital
        signature to the messages exchanged.</xsd:documentation>
    </xsd:annotation>
</xsd:element>
```

According to the above example, digital signature element 40 is of type xmlDigSigDetailsType and provides details about how to apply digital signatures, for example XML digital signatures, to the messages. In the example in APPENDIX A, a digital signature definition element is used to define an element of type xmlDigSigDetailsType. The following is an example of the digital signature definition element:

```
<xsd:complexType name="xmlDigSigDetailsType">
    ...
</xsd:complexType>
```

The digital signature definition element comprises a digital signature sequence sub-element. The following is an exemplary definition for the digital signature sequence sub-element:

```
<xsd:sequence>
    <xsd:element name="signaturePackaging" type="xsd:anyURI">
        ...
    </xsd:element>
    <xsd:element    name="attachmentSignatureApproach"
    type="xsd:anyURI"
    minOccurs="0">
        ...
    </xsd:element>
    <xsd:element name="partsToBeSigned" type="sec:partsToBeSignedEn
    cryptedType" minOccurs="0"/>
    <xsd:element name="keyTypesSupported"
    type="sec:keyTypesSupportedType"
    minOccurs="0"/>
</xsd:sequence>
```

The digital signature sequence sub-element preferably provides a list of elements which comprise digital signature element 40 and which, according to schema 34, are to be defined in a digital signature extension element 40' of web-services interface 18. If no digital signature extension element is specified in web-services interface 18 or if some elements, sub-elements, and/or attributes are omitted, then preferably default values apply, for example a SOAP Security Extension as defined by the World Wide Web Consortium.

Digital signature element 40 comprises a plurality of elements, such as a signature packaging element, an attachment signature approach element, a parts to be signed element, and a key types supported signature element, for example signaturePackaging, attachmentSignatureApproach, partsToBeSigned, and keyTypesSupported.

The following is an exemplary definition for the signature packaging element:

```
<xsd:element name="signaturePackaging" type="xsd:anyURI">
    <xsd:annotation>
        <xsd:documentation>There are several ways to put a digital
        signature into the SOAP header. Specifies which
        one to use.</xsd:documentation>
    </xsd:annotation>
</xsd:element>
```

According to the above example, a signature packaging extension element of digital signature extension element 40' of web-services interface 18 preferably specifies a signature packaging specification that may be used by the sender of the message, for example service requestor 14, to incorporate a digital signature, for example an XML digital signature, in the header of a message, such as a SOAP header. In particular the specification specifies the SOAP header tags to be used around an XML digital signature. The signature packaging element is of type anyURI, which indicates that any URI referencing a signature packaging specification may be specified.

The following is an exemplary definition for the attachment signature approach element:

```
<xsd:element name="attachmentSignatureApproach"
type="xsd:anyURI"
minOccurs="0">
    <xsd:annotation>
        <xsd:documentation>There are several ways to sign attachments
        and where to put the digital signature. Specifies which one
        to use.</xsd:documentation>
    </xsd:annotation>
</xsd:element>
```

According to the above example, an attachment signature approach extension element of digital signature extension element 40' of web-services interface 18 preferably specifies a method for service requestor 14 for digitally signing an attachment to the message. It is desirable to include the attachment signature approach extension element in web-services interface 18 when it is desirable that attachments to a message be digitally signed. The attachment signature approach element is of type anyURI, which indicates that any URI referencing a method for digitally signing an attachment may be specified. The attachment signature approach element has a minimum occurrence (minOccurs) value of zero, which indicates that the attachment signature approach extension element is optional in digital signature extension element 40' of web-services interface 18.

The following is an exemplary definition for the parts to be signed element:

```
<xsd:element name="partsToBeSigned" type="sec:
    partsToBeSignedEncrypted Type" minOc-
    curs="0"/>
```

According to the above example, a parts to be signed extension element of digital signature extension element 40' of web-services interface 18 preferably provides details about which parts of the message, if any, are to be digitally signed. The parts to be signed element has a minimum occurrence (minOccurs) value of zero, which indicates that the parts to be signed extension element is optional in digital signature extension element 40' of web-services interface 18. The parts to be signed element is of type partsToBeSignedEncrypted-Type. In the example in APPENDIX A, a parts to be signed definition element is used to define an element of type partsToBeSignedEncryptedType. The following is an example of the parts to be signed definition element:

```
<xsd:complexType name="partsToBeSignedEncryptedType">
    ...
</xsd:complexType>
```

The parts to be signed definition element comprises a parts to be signed sequence sub-element. The parts to be signed sequence sub-element preferably provides a list of elements which comprise the parts to be signed element of digital signature element 40 and/or encryption element 42. The following is an exemplary definition for the parts to be signed sequence sub-element:

```
<xsd:sequence>
    <xsd:element  name="URI"  type="xsd:anyURI"  minOccurs="0"
    maxOccurs="unbounded">
        ...
    </xsd:element>
    <xsd:element  name="part"  type="xsd:NMTOKEN"
    minOccurs="0"
    maxOccurs="unbounded">
        ...
    </xsd:element>
</xsd:sequence>
<xsd:attribute name="adherence" type="sec:adherenceType"
use="optional" default="required"/>
```

According to the above definition, the parts to be signed element comprises a plurality of elements, such as a URI element and a part element, for example URI and part. The following is an exemplary definition for the URI element:

```
<xsd:element  name="URI"  type="xsd:anyURI"  minOccurs="0"
maxOccurs="unbounded">
    <xsd:annotation>
        <xsd:documentation>References  segments  to  be
        encrypted/signed.</xsd:documentation>
    </xsd:annotation>
</xsd:element>
```

According to the above example, the URI element specifies the parts of a message to be digitally signed or encrypted. The URI element is of type anyURI, which indicates that any URI referencing an element of a message may be specified. Preferably, the value specified for the URI element corresponds to the value used in a URI attribute of a Reference element of a portion of a digital signature, for example in a SignedInfo element of an XML digital signature. The URI element has a minimum occurrence (minOccurs) value of zero and a maximum occurrence (maxOccurs) value of "unbounded", which indicates that this element may appear zero or more times in digital signature extension element 40' and/or encryption extension element 42'.

A part to be signed or encrypted may also be defined by the part element. The following is an exemplary definition for the part element:

```
<xsd:element name="part" type="xsd:NMTOKEN"
minOccurs="0" maxOccurs="unbounded">
    <xsd:annotation>
        <xsd:documentation>References the parts defined in WSDL
        definitions/messages.</xsd:documentation>
    </xsd:annotation>
</xsd:element>
```

According to the above example, the part element has a minimum occurrence (minOccurs) value of zero and a maximum occurrence (maxOccurs) value of "unbounded", which indicates that this element may appear zero or more times in digital signature extension element 40' and/or encryption extension element 42'. The part element is of type NMTOKEN. Preferably, the value specified for the part element corresponds to a previously defined part in a web-services interface, for example web-services interface 18. The part element may also be used to specify which attachments are to be digitally signed or encrypted.

According to the schema in APPENDIX A, the parts to be signed definition element also comprises an adherence attribute. The following is an exemplary definition for the adherence attribute:

```
<xsd:attribute name="adherence" type="sec:adheren-
    ceType" use="optional" default="required"/>
```

According to the above example, the adherence attribute is of the type adherenceType. In the example in APPENDIX A, an adherence type definition element is used to define an element of type adherenceType. The adherence attribute specifies the extent to which service provider 12 and/or service requestor 14 have to adhere to the list of parts specified in digital signature extension element 40' of web-services interface 18.

The adherence type definition element specifies the possible values for attributes, such as the adherence attribute. The following is an example of the adherence type definition element:

```
<xsd:simpleType name="adherenceType">
    <xsd:restriction base="xsd:NMTOKEN">
        <xsd:enumeration value="optional"/>
        <xsd:enumeration value="required"/>
        <xsd:enumeration value="minimum"/>
    </xsd:restriction>
</xsd:simpleType>
```

According to the above example, the adherence type definition element comprises a restriction base element of type NMTOKEN. The adherence type definition element restricts the name tokens that may be used by defining enumeration values. The possible enumeration values are "optional", "required", and "minimum". Preferably, the default value for the adherence attribute is "required", i.e. the provided list is the exact list of parts to be digitally signed and/or encrypted. A value of "minimum" for the adherence attribute indicates that the provided list is the minimum list of parts to be digitally signed and/or encrypted and, if desired, additional parts may be digitally signed and/or encrypted. A value of "optional" for the adherence attribute indicates that the provided list is an optional list of parts to be digitally signed and/or encrypted and, if desired, fewer or additional parts may be digitally signed and/or encrypted.

The following is an exemplary definition for the key types supported signature element:

```
<xsd:element name="keyTypesSupported" type="sec:
    keyTypesSupportedType" minOccurs="0"/>
```

According to the above example, a key types supported signature extension element of digital signature extension element 40' of web-services interface 18 preferably specifies which key systems may be used. The key types supported signature element has a minimum occurrence (minOccurs) value of zero, which indicates that the key types supported signature extension element is optional in digital signature extension element 40' of web-services interface 18. The key types supported signature element is of type keyTypesSupportedType. In the example in APPENDIX A, a key types supported definition element is used to define an element of type keyTypesSupportedType. The following is an example of the key types supported definition element:

```
<xsd:complexType name="keyTypesSupportedType">
    ...
</xsd:complexType>
```

The key types supported definition element comprises a key types supported sequence sub-element. The following is an exemplary definition for the key types supported sequence sub-element:

```
<xsd:sequence>
    <xsd:element name="keyType" type="xsd:string"
    minOccurs="0" maxOccurs="unbounded">
        <xsd:annotation>
            <xsd:documentation>Names of encryption key types that can be
            handled.</xsd:documentation>
        </xsd:annotation>
    </xsd:element>
</xsd:sequence>
```

According to the above example, the key types supported sequence sub-element comprises a key type element, for example keyType. The key type element has a minimum occurrence (minOccurs) value of zero and a maximum occurrence (maxOccurs) value of "unbounded", which indicates that this element may appear zero or more times in digital signature extension element 40' and/or encryption extension element 42'. The key type element is of type string. It denotes the names of key types that can be handled by service provider 12, for example, RSA, DSA, X509, and/or the like. Any of the listed key types may be used by service requestor 14 to encrypt the message transmitted by service requestor 14 to service provider 12.

Schema 34 comprises an encryption element 42. Encryption element 42 informs service requestor 14 about how to apply an encryption to the message. If no encryption details element extension is specified in web-services interface 18 or if some elements, sub-elements, and/or attributes are omitted, then preferably default values apply. The following is an exemplary definition for encryption element 42:

```
<xsd:element name="xmlEncryptionDetails"
    type="sec:xmlEncryptionDetails Type">
    <xsd:annotation>
        <xsd:documentation>Provides details about how to apply encryption
            to the messages exchanged.</xsd:documentation>
    </xsd:annotation>
</xsd:element>
```

According to the above example, encryption element 42 is of type xmlEncryptionDetailsType and provides details about how to apply encryption, for example XML encryption, to the messages. In the example in APPENDIX A, an encryption details definition element is used to define an element of type xmlEncryptionDetailsType. The following is an example of the encryption details definition element:

```
<xsd:complexType name="xmlEncryptionDetailsType">
    ...
</xsd:complexType>
```

The encryption details definition element comprises an encryption details sequence sub-element. The encryption details sequence sub-element preferably provides a list of elements which comprise encryption element 42 and which, according to schema 34, are to be defined in an encryption extension element 42' of web-services interface 18. The following is an exemplary definition for the encryption details sequence sub-element:

```
<xsd:sequence>
    <xsd:element name="attachmentEncrypionApproach"
        type="xsd:anyURI"
        minOccurs="0">
        ...
    </xsd:element>
    <xsd:element name="partsToBeEncrypted" type="sec:partsToBeSigned
        EncryptedType" minOccurs="0"/>
    <xsd:element name="keyTypesSupported" type=
        "sec:keyTypesSupportedType"
        minOccurs="0"/>
        ...
    </xsd:element>
</xsd:sequence>
```

According to the above definition, encryption element 42 comprises a plurality of elements, such as an attachment encryption approach element, a parts to be encrypted element and a key types supported encryption element, for example attachmentEncryptionApproach, partsToBeEncrypted, and keyTypesSupported, as listed in the above sequence sub-element. The following is an exemplary definition for the attachment encryption approach element:

```
<xsd:element name="attachmentEncryptionApproach" type="xsd:anyURI"
    minOccurs="0">
    <xsd:annotation>
        <xsd:documentation>There are several ways to encrypt an attachment.
            Specifies which one to use.</xsd.documentation>
    </xsd:annotation>
</xsd:element>
```

There are several ways to encrypt a message. For example a WS-Security specification uses a SOAP header element, such as credentials, for transferring encrypted attachments. On the other hand, in a MIME-XML-Security specification, attachments are encrypted using an additional mime protocol, for example, "application/encryption+xml". According to the above example, an attachment encryption approach extension element of encryption extension element 42' of web-services interface 18 may be used by service provider 12 to inform service requestor 14 on the approach to be used for encrypting an attachment. It is desirable to include the attachment encryption approach extension element in web-services interface 18 when it is desirable that attachments to a message be encrypted. The attachment encryption approach element is of type anyURI, which indicates that any URI referencing a method for encrypting an attachment may be specified. Service requestor 14 may use the specified method for encrypting an attachment to the message. If an attachment encryption approach extension element is not specified, then service requestor 14 may choose the approach for encrypting an attachment. The attachment encryption approach element has a minimum occurrence (minOccurs) value of zero, which indicates that the attachment encryption approach extension element is optional in encryption extension element 42' of web-services interface 18, The following is an exemplary definition for the parts to be encrypted element:

```
<xsd:element name="partsToBeEncrypted"
    type="sec:partsToBeSignedEncrypted Type"
    minOccurs="0"/>
```

According to the above example, a parts to be encrypted extension element of encryption extension element 42' of web-services interface 18 provides details about which parts of the message, if any, are to be encrypted. The parts to be encrypted element has a minimum occurrence (minOccurs) value of zero, which indicates that the parts to be encrypted extension element is optional in web-services interface 18. The parts to be encrypted element is of type partsToBe-SignedEncryptedType. In the example in APPENDIX A, a parts to be signed definition element is used to define an element of type partsToBeSignedEncryptedType.

The following is an exemplary definition for the key types supported encryption element:

```
<xsd:element name="keyTypesSupported" type="
    sec:keyTypesSupportedType" minOccurs="0"/>
    <xsd:annotation>
        <xsd:documentation>Gives a hint about possible key
            systems.</xsd:documentation>
    </xsd:annotation>
</xsd:element>
```

According to the above example, a key types supported encryption extension element of encryption extension element 42' of web-services interface 18 specifies which key systems may be used. The key types supported encryption element has a minimum occurrence (minOccurs) value of zero, which indicates that the key types supported extension element is optional in encryption extension element 42' of web-services interface 18. The key types supported encryption element is of type keyTypesSupportedType. In the example in APPENDIX A, a key types supported definition element is used to define an element of type keyTypesSupportedType.

Schema 34 comprises a security integrity element 44. The following is an exemplary definition for security integrity element 44:

```
<xsd:element name="wsSecurityIntegrityDetails"
    type="sec:wsSecurityExtension Type"/>
```

According to the above example, security integrity element 44 is of type wsSecurityExtensionType and provides a reference to schemas that define an extension to a predetermined element of a specification, for example an integrity element of the WS-Security specification. In the example in APPENDIX A, a security extension type definition element is used to define an element of type wsSecurityExtensionType.

Schema 34 comprises a security confidentiality element 46. The following is an exemplary definition for security confidentiality element 46:

```
<xsd:element
    name="wsSecurityConfidentialityDetails"
    type="sec:wsSecurityExten sionType"/>
```

According to the above example, security confidentiality element 46 is of type wsSecurityExtensionType and provides a reference to schemas that define an extension to a predetermined element of a specification, for example a confidentiality element of the WS-Security specification. In the example in APPENDIX A, a security extension type definition element is used to define an element of type wsSecurityExtensionType.

The following is an example of the security extension type definition element:

```
<xsd:complexType name="wsSecurityExtensionType">
    <xsd:sequence>
        <xsd:element   name="extensionElements"   type="xsd:anyURI"
            minOccurs="0" maxOccurs="unbounded"/>
        <xsd:element   name="extensionAttributes"   type="xsd:anyURI"
            minOccurs="0" maxOccurs="unbounded"/>
    </xsd:sequence>
</xsd:complexType>
```

According to the above example, the security extension type definition element preferably provides a list of elements to be defined in a security integrity extension element 44' and/or a security confidentiality extension element 46' of web-services interface 18. The security extension type definition element comprises a plurality of elements, such as an extension elements element and an extension attributes element, for example extensionElements, and extensionAttributes.

The extension elements element has a minimum occurrence (minOccurs) value of zero and a maximum occurrence (maxOccurs) value of "unbounded", which indicates that this element may appear zero or more times in security integrity extension element 44' and/or security confidentiality extension element 46' of web-services interface 18. It is of type URI and may be used to specify any URI. The extension attributes element has a minimum occurrence (minOccurs) value of zero and a maximum occurrence (maxOccurs) value of "unbounded", which indicates that this element may appear zero or more times in security integrity extension element 44' and/or security confidentiality extension element 46' of web-services interface 18. It is of type URI and may be used to specify any URI. The extension elements element and the extension attributes element are optional and may be used to specify any additional information.

In accordance with an embodiment of the present invention, security element extension 32 preferably comprises a plurality of elements. Preferably, security element extension 32 comprises of the elements specified by schema 34 of FIG. 3, such as a security binding extension element 36', a security algorithm extension element 38', a digital signature extension element 40', an encryption extension element 42', a security integrity extension element 44' and a security confidentiality extension element 46'. The following is an example of security element extension 32:

```
<sec:securityBinding ...>
    ...
</sec:securityBinding>
<sec:securityAlgorithmDetails>
    ...
</sec:securityAlgorithmDetails>
<sec.xmlDigSigDetails>
    ...
</sec:xmlDigSigDetails>
<sec:xmlEncryptionDetails>
    ...
</secxmlEncryptionDetails>
<sec:wsSecurityIntegrityDetails>
    ...
</sec:wsSecurityIntegrityDetails>
<sec:wsSecurityConfidentialityDetails>
    ...
</sec:wsSecurityConfidentialityDetails>
```

Security binding extension element 36' preferably comprises one or more of the following: an encryption attribute, a security attribute, an encryption supported extension element, a signature supported extension element, an encryption used extension element, and a signature used extension element. Security binding extension element 36' may be used as an extension element in the WSDL elements binding, binding/operation, binding/operation/input, binding/operation/output, and binding/operation/fault. The following is an example of security binding extension element 36':

```
<sec:securityBinding encryption="none" signature="required">
    <sec:signatureSupported>http://www.w3.org/2000/09/xmldsig
    </sec:signatureSupported>
    <sec:signatureSupported>http://smime/.../... </sec:signatureSupported>
    <sec:signatureUsed>http://www.w3.org/2000/09/xmldsig
    </sec:signature Used>
</sec:securityBinding>
```

According to the above example, encryption is not allowed (encryption="none"). As such no algorithms for encryption are listed in the above security binding extension element. However, use of a digital signature is required (signature="required"). Service provider 12 supports two types of digital signatures as listed in the signature supported extension elements. According to the above example, when service provider 12 transmits a message, it uses a single type of digital signature as listed in the signature used extension element ("<sec:signatureUsed>http://www.w3.org/2000/09/xmldsig</sec:signatureUsed>"). Thus, the above security binding extension element informs service requestor 14 that service provider 12 does not accept encrypted messages but requires messages to be digitally signed. Also, messages for service provider 12 may be signed using any method listed in the signature supported extension elements. However, messages from service provider 12 are digitally signed using the method listed in the signature used extension element.

Security algorithm extension element 38' preferably comprises one or more of the following: a signature algorithm supported extension element, a transform algorithm supported extension element, a digest algorithm supported extension element, a canonicalization algorithm supported extension element, a signature algorithm used extension element, a transform algorithm used extension element, a digest algorithm used extension element, and a canonicalization algorithm used extension element. Security algorithm extension element 38' may be used as an extension element in the WSDL elements binding, binding/operation, binding/operation/input, binding/operation/output, and binding/operation/fault. The following is an example of security algorithm extension element 38':

```
<sec:securityAlgorithmDetails>
    <sec:transformAlgorithmSupported>http://www.w3.org/TR/2000/
      CR-xml-c14n-20001026</sec:transformAlgorithmsSupported>
    <sec:digestAlgorithmSupported>http://www.w3.org/2000/09/
      xmldsig#sha1</sec:digestAlgorithmSupported>
    <sec:signatureAlgorithmSupported>http://www.w3.org/2000/09/
      xmldsig#dsa-sha1</sec:signatureAlgorithmSupported>
    <sec:canonicalizationAlgorithmSupported>http://www.w3.org/
      TR/2000/CR-xml-c14n-20001026
    </sec:canonicalizationAlgorithmSupported>
    <sec:digestAlgorithmUsed>http://www.w3.org/2000/09/
      xmldsig#sha1</sec:
       digestAlgorithmUsed>
</sec:securityAlgorithmDetails>
```

According to the above example, service provider 12 supports a transform algorithm as listed in the transform algorithm supported extension element ("<sec:transformAlgorithmSupported>http://www.w3.org/TR/2000/CR-xml-c14n-20001026</sec:transformAlgorithmsSupported>"). Service provider 12 also supports a digest algorithm as listed in the digest algorithm supported extension element ("<sec:digestAlgorithmSupported>http://www.w3.org/2000/09/xmldsig#sha1</sec:digestAlgorithmSupported>"). Service provider 12 supports a signature algorithm as listed in the signature algorithm supported extension element ("<sec:signatureAlgorithmSupported>http://www.w3.org/2000/09/xmldsig#dsa-sha1</sec:signatureAlgorithmSupported>"). A canonicalization algorithm as listed in the canonicalization algorithm supported extension element ("<sec:canonicalizationAlgorithmSupported>http://www.w3.org/TR/2000/CR-xml-c14n-20001026</sec:canonicalizationAlgorithmSupported>") is also supported by service provider 12. As listed in the digest algorithm used extension element ("<sec:digestAlgorithmUsed>http:/www.w3.org/2000/09/xmldsig#sha1</sec:digestAlgorith mUsed>"), service provider 12 uses the same digest algorithm for messages it transmits as the digest algorithm it expects service requestor 14 to use for messages transmitted to service provider 12.

Digital signature extension element 40' preferably comprises one or more of the following: a signature packing extension element, an attachment signature approach extension element, a parts to be signed extension element, an adherence attribute, and a key types supported signature extension element. Digital signature extension element 40' may be used as an extension element in the WSDL elements binding, binding/operation, binding/operation/input, binding/operation/output, and binding/operation/fault. The following is an example of digital signature extension element 40'.

```
<sec:xmlDigSigDetails>
    <sec:signaturePackaging>http://schemas.Xmlsoap.org/ws/2001/10/
      security</sec:signaturePackaging>
    <sec:partsToBeSigned adherence="optional">
      <sec:URI>#Body</sec:URI>
    </sec:partsToBeSigned>
</sec:xmlDigSigDetails>
```

According to the above example, the signature packaging extension element lists a packaging specification to be used by service requestor 14 for incorporating a digital signature in a message. The parts to be signed extension element lists the body of the message as the only part of the message to be digitally signed. However, the value of the adherence attribute is optional indicating that the list is an optional list of parts to be digitally signed and fewer or more parts may be digitally signed.

Encryption extension element 42' preferably comprises one or more of the following: an attachment encryption approach extension element, a parts to be encrypted extension element, an adherence attribute, and a key types supported encryption extension element. Encryption extension element 42' may be used as an extension element in the WSDL elements binding, binding/operation, binding/operation/input, binding/operation/output, and binding/operation/fault. In the exemplary web-services interface in APPENDIX B, an encryption extension element is not defined as encryption is not allowed.

Security integrity extension element 44' preferably comprises one or more of the following: an extension elements extension and an extension attributes element. Security integrity extension element 44' may be used as an extension element in the WSDL elements binding, binding/operation, binding/operation/input, binding/operation/output, and binding/operation/fault. The following is an example of security integrity extension element 44':

```
<sec:wsSecurityIntegrityDetails>
    <sec:extensionElements>http://schemas.examples.org/
      myPersonalApplicationSpecificSchema
    </sec:extensionElements>
</sec:wsSecurityIntegrityDetails>
```

In the above example, the extension elements extension lists a URI to a schema, for example a schema that defines an extension element or attribute for the element integrity of the WS-Security specification. Security confidentiality extension element 46' preferably comprises one or more of the following: an extension elements extension and an extension attributes element. Security confidentiality extension element 46' may be used as an extension element in the WSDL elements binding, binding/operation, binding/operation/input, binding/operation/output, and binding/operation/fault. In the exemplary web-services interface in APPENDIX B, a security confidentiality extension element is not defined.

APPENDIX C provides a generic definition for a security element extension for a web-services interface in accordance with schema 34 of FIG. 3. In the generic definition of APPENDIX C, a '?' indicates an optional element, a '+' indicates an element that can occur one or more times, and an '*' indicates an element that can occur zero or more times.

FIGS. 5A-5H illustrate a flowchart of an exemplary method for processing, in accordance with an embodiment of the present invention, a message received by the service provider: Method 100 is preferably executed by service provider 12 upon receipt of message 20. At 102, a determination is made as to whether web-services interface 18 requires that the received message be encrypted. This determination may be made, for example, by determining whether the value of the encryption attribute of security binding extension element 36' in web-services interface 18 is set to "required". If the value of the encryption attribute is set to "required", then in block 104, a determination is made as to whether the received message is encrypted. If the received message is not encrypted, then in block 106 an error message may be transmitted to the service requestor. Otherwise, the process starting at 112 may be executed.

If in block 102 it is determined that web-services interface 18 does not require the received message to be encrypted, then in block 108, a determination is made as to whether web-services interface 18 prohibits the received message from being encrypted. This determination may be made, for example, by determining whether the value of the encryption attribute in web-services interface 18 is set to "none". If the value of the encryption attribute is set to "none", then in block 110, a determination is made as to whether the received message is encrypted. If the received message is encrypted, then in block 106 an error message may be transmitted to the service requestor. Otherwise, the process starting at 116 may be executed. If in block 108 it is determined that web-services interface 18 does not prohibit the received message from being encrypted, then the process starting at 112 may be executed.

In block 112, a determination is made as to whether web-services interface 18 comprises an encryption supported extension element. If web-services interface 18 does not comprise an encryption supported extension element, then the process starting at 116 may be executed. Otherwise, in block 114, a determination is made as to whether the encryption used to encrypt the message is consistent with the encryption supported extension element. If the type of encryption used is not consistent with the encryption supported extension element, then in block 106 an error message may be transmitted to the service requestor. Otherwise, the process starting at 116 may be executed.

In block 116, a determination is made as to whether web-services interface 18 requires that the received message be digitally signed. This determination may be made, for example, by determining whether the value of the signature attribute of security binding extension element 36' in web-services interface 18 is set to "required". If the value of the signature attribute is set to "required", then in block 118, a determination is made as to whether the received message is digitally signed. If the received message is not digitally signed, then in block 106 an error message may be transmitted to the service requestor. Otherwise, the process starting at 124 may be executed.

If in block 116 it is determined that web-services interface 18 does not require the received message to be digitally signed, then in block 120, a determination is made as (o whether web-services interface 18 prohibits the received message from being digitally signed. This determination may be made, for example, by determining whether the value of the signature attribute in web-services interface 18 is set to "none". If the value of the signature attribute is set to "none", then in block 122, a determination is made as to whether the received message is digitally signed. If the received message is digitally signed, then in block 106 an error message may be transmitted to the service requestor. Otherwise, the process starting at 136 may be executed. If in block 120 it is determined that web-services interface 18 does not prohibit the received message from being digitally signed, then the process starting at 124 may be executed.

In block 124, a determination is made as to whether web-services interface 18 comprises a signature supported extension element. If web-services interface 18 does not comprise a signature supported extension element, then the process starting at block 136 may be executed. Otherwise, in block 126, a determination is made as to whether the signature used to digitally sign the message is consistent with the signature supported extension element. If the type of signature used is not consistent with the signature supported extension element, then in block 106 an error message may be transmitted to the service requestor. Otherwise, the process starting at 128 may be executed.

In block 128, a determination is made as to whether the received message uses a signature algorithm. If the received message does not use a signature algorithm, then the process starting at 136 may be executed. Otherwise, in block 130, a determination is made as to whether web-services interface 18 comprises a signature algorithm supported extension element. If web-services interface 18 does not comprise a signature algorithm supported extension element, then in block 132 a determination is made as to whether the default signature algorithm has been used by the received message. If the default signature algorithm has not been used by the received message, then in block 106 an error message may be transmitted to the service requestor. Otherwise, the process starting at 136 may be executed. If in block 130 it is determined that web-services interface 18 comprises a signature algorithm supported extension element, then in block 134, a determination is made as to whether the signature algorithm used is consistent with the signature algorithm supported extension element. If the signature algorithm used is not consistent with the signature algorithm supported extension element, then in block 106 an error message may be transmitted to the service requestor. Otherwise, the process starting at 136 may be executed.

In block 136, a determination is made as to whether the received message uses a chemicalization algorithm. If the received message does not use a canonicalization algorithm, then the process starting at 144 may be executed. Otherwise, in block 138, a determination is made as to whether web-services interface 18 comprises a canonicalization algorithm supported extension element. If web-services interface 18 does not comprise a canonicalization algorithm supported extension element, then in block 140 a determination is made as to whether the default canonicalization algorithm has been used by the received message. If the default canonicalization algorithm has not been used by the received message, then in block 106 an error message may be transmitted to the service requestor. Otherwise, the process starting at 144 may be executed. If in block 138 it is determined that web-services interface 18 comprises a canonicalization algorithm supported extension element, then in block 142, a determination is made as to whether the canonicalization algorithm used is consistent with the canonicalization algorithm supported extension element. If the canonicalization algorithm used is not consistent with the canonicalization algorithm supported extension element, then in block 106 an error message may be transmitted to the service requestor. Otherwise, the process starting at 144 may be executed.

In block 144, a determination is made as to whether the received message uses a transform algorithm. If the received message does not use a transform algorithm, then the process starting at 152 may be executed. Otherwise, in block 146, a determination is made as to whether web-services interface 18 comprises a transform algorithm supported extension element. If web-services interface 18 does not comprise a transform algorithm supported extension element, then in block 148 a determination is made as to whether the default transform algorithm has been used by the received message. If the default transform algorithm has not been used by the received message, then in block 106 an error message may be transmitted to the service requestor. Otherwise, the process starting at 152 may be executed. If in block 146 it is determined that web-services interface 18 comprises a transform algorithm supported extension element, then in block 150, a determination is made as to whether the transform algorithm used is consistent with the transform algorithm supported extension element. If the transform algorithm used is not consistent with the transform algorithm supported extension element, then in block 106 an error message may be transmitted to the service requestor. Otherwise, the process starting at 152 may be executed.

In block 152, a determination is made as to whether the received message uses a digest algorithm. If the received message does not use a digest algorithm, then the process starting at 160 may be executed. Otherwise, in block 154, a determination is made as to whether web-services interface 18 comprises a digest algorithm supported extension element. If web-services interface 18 does not comprise a digest algorithm supported extension element, then in block 156 a determination is made as to whether the default digest algorithm has been used by the received message. If the default digest algorithm has not been used by the received message, then in block 106 an error message may be transmitted to the service requestor. Otherwise, the process starting at 160 may be executed. If in block 154 it is determined that web-services interface 18 comprises a digest algorithm supported extension element, then in block 158, a determination is made as to whether the digest algorithm used is consistent with the digest algorithm supported extension element. If the digest algorithm used is not consistent with the digest algorithm supported extension element, then in block 106 an error message may be transmitted to the service requestor. Otherwise, the process starting at 160 may be executed.

In block 160, a determination is made as to whether the received message has been digitally signed. If the received message has not been digitally signed, then the process starting at block 188 may be executed. Otherwise, in block 162 a determination is made as to whether web-services interface 18 comprises digital signature extension element 40'. If web-services interface 18 does not comprise digital signature extension element 40', then in block 164 a determination is made as to whether a default signature packaging has been used. If the default signature packaging has not been used by the received message, then in block 106 an error message may be transmitted to the service requestor. Otherwise, the process starting at 168 may be executed. If in block 162 it is determined that web-services interface 18 comprises digital signature extension element 40', then in block 166, a determination is made as to whether the signature packaging used is consistent with a signature packaging extension element of digital signature extension element 40'. If the signature packaging used is not consistent with the signature packaging extension element, then in block 106 an error message may be transmitted to the service requestor. Otherwise, the process starting at 168 may be executed.

In block 168, a determination is made as to whether an attachment to the received message has been digitally signed. If the attachment to the received message has not been digitally signed, then the process starting at 176 may be executed. Otherwise, in block 170 a determination is made as to whether web-services interface 18 comprises an attachment signature approach extension element. If web-services interface 18 does not comprise an attachment signature approach extension element, then in block 172 a determination is made as to whether the attachment has been signed consistent with a default attachment signature approach. If the attachment has not been signed consistent with the default attachment signature approach, then in block 106 an error message may be transmitted to the service requestor. Otherwise, the process starting at 176 may be executed. If in block 170 it is determined that web-services interface 18 comprises an attachment signature approach extension element, then in block 174, a determination is made as to whether the attachment has been signed consistent with the attachment signature approach extension element. If the attachment has not been signed consistent with the attachment signature approach extension element, then in block 106 an error message maybe transmitted to the service requestor. Otherwise, the process starting at 176 may be executed.

In block 176, a determination is made as to whether web-services interface 18 comprises a parts to be signed extension element. If web-services interface 18 does not comprise a parts to be signed extension element, then the process starting at 188 may be executed. Otherwise, in block 178 a determination is made as to whether the parts to be signed extension element comprises an adherence attribute. If the parts to be signed extension element does not comprise an adherence attribute, then the process starting at 184 may be executed. Otherwise, in block 180, a determination is made as to whether the value of the adherence attribute is "optional". If the value of the adherence attribute is "optional", then the process starting at 188 may be executed. Otherwise, in block 182, a determination is made as to whether the value of the adherence attribute is "minimum". If the value of the adherence attribute is not "minimum", then the process starting at 184 may be executed. Otherwise, in block 186, a determination is made as to whether all the listed parts have been signed. If all the listed parts have not been signed, then in block 106 an error message may be transmitted to the service requestor. Otherwise, the process starting at 188 may be executed.

In block 184, a determination is made as to whether the signed parts arc exactly those required to be signed. If the signed parts are not exactly those required to be signed, then in block 106 an error message may be transmitted to the service requestor. Otherwise, the process starting at block 188 may be executed.

In block 188, the received message is processed.

The present invention may be implemented in software, hardware, or a combination of both software and hardware. The software and/or hardware may reside on web-services server 22 and/or service requestor agent 24.

If desired, the different functions discussed herein may be performed in any order and/or concurrently with each other. Furthermore, if desired, one or more of the above described functions may be optional or may be combined without departing from the scope of the present invention.

A technical advantage of an exemplary embodiment of the present invention is that a service provider receiving a web-services message is able to determine whether the web-services message is secured in accordance with the security features as defined by the service provider. Another technical advantage of an exemplary embodiment of the present invention is that a service requestor is able to determine the security features that a service provider expects in web-services messages.

APPENDIX

Appendix A

```xml
<xsd:schema targetNamespace="http://schemas.hp.com/web-services/wsdl/security"
xmlns:sec="http://schemas.hp.com/web-services/wsdl/security" . . .>
    <xsd:element name="securityBinding" type="sec:securityBindingType"/>
    <xsd:complexType name="securityBindingType">
        <xsd:sequence>
            <xsd:element name="encryptionSupported" type="xsd:anyURI" minOccurs="0"
            maxOccurs="unbounded"/>
            <xsd:element name="signatureSupported" type="xsd:anyURI" minOccurs="0"
            maxOccurs="unbounded"/>
            <xsd:element name="encryptionUsed" type="xsd:anyURI" minOccurs="0"/>
            <xsd:element name="signatureUsed" type="xsd:anyURI" minOccurs="0"/>
        </xsd:sequence>
        <xsd:attribute name="encryption" type="sec:requirementsType" use="optional"
        default="optional"/>
        <xsd:attribute name="signature" type="sec:requirementsType" use="optional"
        default="optional"/>
    </xsd:complexType>
    <xsd:simpleType name="requirementsType">
        <xsd:annotation>
            <xsd:documentation>Specifies the possible values for attributes like encryption
            and signature.</xsd:documentation>
        </xsd:annotation>
        <xsd:restriction base="xsd:NMTOKEN">
            <xsd:enumeration value="none"/>
            <xsd:enumeration value="optional"/>
            <xsd:enumeration value="required"/>
        </xsd:restriction>
    </xsd:simpleType>
    <xsd:element name="securityAlgorithmDetails"
    type="sec:securityAlgorithmDetailsType"/>
        <xsd:complexType name="securityAlgorithmDetailsType">
        <xsd:sequence>
            <xsd:element name="signatureAlgorithmSupported" type="xsd:anyURI" minOcc
            urs="0" maxOccurs="unbounded"/>
            <xsd:element name="cannonicalizationAlgorithmSupported" type="xsd:anyURI"
            minOccurs="0" maxOccurs="unbounded"/>
            <xsd:element name="transformAlgorithmSupported" type="xsd:anyURI" minOccurs
            ="0" maxOccurs="unbounded"/>
            <xsd:element name="digestAlgorithmSupported" type="xsd:anyURI"
            minOccurs="0" maxOccurs="unbounded"/>
            <xsd:element name="signatureAlgorithmUsed" type="xsd:anyURI"
            minOccurs="0"/>
            <xsd:element name="canonicalizationAlgorithmUsed" type="xsd:anyURI"
            minOccurs="0"/>
            <xsd:element name="transformAlgorithmUsed" type="xsd:anyURI"
            minOccurs="0"/>
            <xsd:element name="digestAlgorithmUsed" type="xsd:anyURI"
            minOccurs="0"/>
        </xsd:sequence>
    </xsd:complexType>
    <xsd:element name="xmlDigSigDetails" type="sec:xmlDigSigDetailsType">
        <xsd:annotation>
            <xsd:documentation>Provides details about how to apply a digital signature to the
            messages exchanged.</xsd:documentation>
        </xsd:annotation>
    </xsd:element>
    <xsd:complexType name="xmlDigSigDetailsType">
        <xsd:sequence>
            <xsd:element name="signaturePackaging" type="xsd:anyURI">
                <xsd:annotation>
                    <xsd:documentation>There are several ways to put a digital signature into
                    the SOAP header. Specifies which one to use.</xsd:documentation>
                </xsd:annotation>
            </xsd:element>
            <xsd:element name="attachmentSignatureApproach" type="xsd:anyURI"
            minOccurs="0">
                <xsd:annotation>
                    <xsd:documentation>There are several ways to sign attachments and
                    where to put the digital signature. Specifies which one to
                    use.</xsd:documentation>
                </xsd:annotation>
            </xsd:element>
```

```
            <xsd:element                     name="partsToBeSigned"
         type="sec:partsToBeSignedEncryptedType" minOccurs="0"/>
            <xsd:element name="keyTypesSupported" type="sec:keyTypesSupportedType"
         minOccurs="0"/>
         </xsd:sequence>
      </xsd:complexType>
      <xsd:element name="xmlEncryptionDetails" type="sec:xmlEncryptionDetailsType">
         <xsd:annotation>
            <xsd:documentation>Provides details about how to apply encryption to the
         messages exchanged.</xsd:documentation>
         </xsd:annotation>
      </xsd:element>
      <xsd:complexType name="xmlEncryptionDetailsType">
         <xsd:sequence>
            <xsd:element   name="attachmentEncryptionApproach"   type="xsd:anyURI"
         minOccurs="0">
               <xsd:annotation>
                  <xsd:documentation>There are several ways to encrypt an attachment.
               Specifies which one to use.</xsd:documentation>
               </xsd:annotation>
            </xsd:element>
            <xsd:element                     name="partsToBeEncrypted"
         type="sec:partsToBeSignedEncryptedType" minOccurs="0"/>
            <xsd:element name="keyTypesSupported" type="sec:keyTypesSupportedType"
         minOccurs="0"/>
               <xsd:annotation>
                  <xsd:documentation>Gives a hint about possible key
               systems.</xsd:documentation>
               </xsd:annotation>
            </xsd:element>
         </xsd:sequence>
      </xsd:complexType>
      <xsd:complexType name="partsToBeSignedEncryptedType">
         <xsd:sequence>
            <xsd:element   name="URI"   type="xsd:anyURI"   minOccurs="0"
         maxOccurs="unbounded">
               <xsd:annotation>
                  <xsd:documentation>References   segments   to   be
               encrypted/signed.</xsd:documentation>
               </xsd:annotation>
            </xsd:element>
            <xsd:element   name="part"   type="xsd:NMTOKEN"   minOccurs="0"
         maxOccurs="unbounded">
               <xsd:annotation>
                  <xsd:documentation>References the parts defined in WSDL
               definitions/messages.</xsd:documentation>
               </xsd:annotation>
            </xsd:element>
         </xsd:sequence>
         <xsd:attribute   name="adherence"   type="sec:adherenceType"   use="optional"
         default="required"/>
      </xsd:complexType>
      <xsd:simpleType name="adherenceType">
         <xsd:restriction base="xsd:NMTOKEN">
            <xsd:enumeration value="optional"/>
            <xsd:enumeration value="required"/>
            <xsd:enumeration value="minimum"/>
         </xsd:restriction>
      </xsd:simpleType>
      <xsd:complexType name="keyTypesSupportedType">
         <xsd:sequence>
            <xsd:element   name="keyType"   type="xsd:string"   minOccurs="0"
         maxOccurs="unbounded">
               <xsd:annotation>
                  <xsd:documentation>Names of encryption key types that can be
               handled.</xsd:documentation>
               </xsd:annotation>
            </xsd:element>
         </xsd:sequence>
      </xsd:complexType>
```

```
<xsd:element              name="wsSecurityIntegrityDetails"
      type="sec:wsSecurityExtensionType"/>
<xsd:element              name="wsSecurityConfidentialityDetails"
  type="sec:wsSecurityExtensionType"/>
<xsd:complexType name="wsSecurityExtensionType">
    <xsd:sequence>
       <xsd:element name="extensionElements"  type="xsd:anyURI"  minOccurs="0"
       maxOccurs="unbounded"/>
       <xsd:element name="extensionAttributes" type="xsd:anyURI"  minOccurs="0"
       maxOccurs="unbounded"/>
    </xsd:sequence>
 </xsd:complexType>
</xsd:schema>
```

Appendix B

```
<definitions name=. . . >
 <sec:securityBinding enryption="none" signature="required">
  <sec:signatureSupported>http://www.w3.org/2000/09/xmldsig
  </sec:signatureSupported>
  <sec:signatureSupported>http://smime/.../...</sec:signatureSupported>
  <sec:signatureUsed>http://www.w3.org/2000/09/xmldsig
  </sec:signatureUsed>
 </sec:securityBinding>
 <sec:securityAlgorithmDetails>
    <sec:transformAlgorithmSupported>http://www.w3.org/TR/2000/
    CR-xml-c14n-20001026</sec:transformAlgorithmsSupported>
    <sec:digestAlgorithmSupported>http://www.w3.org/2000/09/
    xmldsig#sha1</sec:digestAlgorithmSupported>
    <sec:signatureAlgorithmSupported>http://www.w3.org/2000/09/
    xmldsig#dsa-sha1</sec:signatureAlgorithmSupported>
    <sec:cannonicalizationAlgorithmSupported>http://www.w3.org/
    TR/2000/CR-xml-c14n-20001026
    </sec:canonicalizationAlgorithmSupported>
    <sec:digestAlgorithmUsed>http://www.w3.org/2000/09/
    xmldsig#sha1</sec:digestAlgorithmUsed>
 </sec:securityAlgorithmDetails>
 <sec:xmlDigSigDetails>
  <sec:signaturePackaging>http://schemas.xmlsoap.org/ws/2001/10/
  security</sec:signaturePackaging>
  <sec:partsToBeSigned adherence="optional">
    <sec:URI>#Body</sec:URI>
  </sec:partsToBeSigned>
 </sec:xmlDigSigDetails>
 <sec:wsSecurityIntegrityDetails>
    <sec:extensionElements>http://schemas.examples.org/
    myPersonalApplicationSpecificSehema
    </sec:extensionElements>
 </sec:wsSecurityIntegrityDetails>
</definitions>
```

Appendix C

```
<sec:securityBinding xmlns:security="http://schemas.hp.com/web-services/wsdl/security"
      encryption="none | optional | required"? signature="none | optional | required"?>
    <encryptionSupported>anyURI</encryptionSupported> *
    <signatureSupported>anyURI</signatureSupported>*
    <encryptionUsed>anyURI</encryptionUsed>?
    <signatureUsed>anyURI</signatureUsed>?
</sec:securityBinding>
<sec:securityAlgorithmDetails
        xmlns:sec="http://schemas.hp.com/web-services/wsdl/security">
    <sec:signatureAlgorithmSupported>anyURI<sec:signatureAlgorithmSupported>*
    <sec:canonicalizationAlgorithmSupported>anyURI<sec:canonicalizationAlgorithmSupported>*
    <sec:transformAlgorithmSupported>anyURI<sec:transformAlgorithmSupported>*
    <sec:digestAlgorithmSupported>anyURI<sec:digestAlgorithmSupported>*
    <sec:signatureAlgorithmUsed>anyURI<sec:signatureAlgorithmUsed>?
    <sec:canonicalizationAlgorithmUsed>anyURI<sec:canonicalizationAlgorithmUsed>?
    <sec:transformAlgorithmUsed>anyURI<sec:transformAlgorithmUsed>?
    <sec:digestAlgorithmUsed>anyURI<sec:digestAlgorithmUsed>?
<sec:securityAlgorithmDetails
<sec:xmlDigSigDetails
        xmlns:sec="http://schemas.hp.com/web-services/wsdl/security">
    <sec:signaturePackaging>anyURI</sec:signaturePackaging>
    <sec:attachmentSignatureApproach>anyURI</sec:attachmentSignatureApproach>?
    <sec:partsToBeSigned adherence="optional | required | minimum">
        <sec:URI>anyURI</sec:URI>*
        <sec:part>nmtoken</sec:part>*
    </sec:partsToBeSigned>?
    <sec:keyTypesSupported>
        <sec:keyType>string</keyType>*
    </sec:keyTypesSupported>?
</sec:xmlDigSigDetails>
```

```
<sec:xmlEncryptionDetails
        xmlns:security="http://schemas.hp.com/web-services/wsdl/security"
    <sec:attachmentEncryptionApproach>anyURI</sec:attachmentEncryptionApproach>?
    <sec:partsToBeEncrypted adherence="optional | required | minimum">
        <sec:URI>anyURI</sec:URI>*
        <sec:part>nmtoken</sec:part>*
    </sec:partsToBeEncrypted>?
    <sec:keyTypesSupported>
        <sec:keyType>string</sec:keyType>*
    </sec:keyTypesSupported>?
</sec:xmlEncryptionDetails>
<sec:wsSecurityIntegrityDetails
        xmlns:sec="http://schemas.hp.com/web-services/wsdl/security">
    <sec:extensionElements>anyURI</sec:extensionElements>*
    <sec:extensionAttributes>anyURI</sec:extensionAttributes>*
</sec:wsSecurityIntegrityDetails>
<sec:wsSecuirtyConfidentialityDetails
        xmlns:sec="http://schemas.hp.com/web-services/wsdl/security">
    <sec:extensionElements>anyURI</sec:extensionElements>*
    <sec:extensionAttributes>anyURI</sec:extensionAttributes>*
</sec:wsSecurityConfidentialityDetails>
```

What is claimed is:

1. A web-services provider interface for a web-service, comprising:
a publisher executable by the web-services provider to generate a web-services interface accessible by a web-services requestor over a network, the web-services interface defining:
a security binding extension element operable to specify at least one security feature for a message transmitted to a service the web-services provider by the web-services requestor; and
a security algorithm extension element operable to specify at least one algorithm to be used for securing said message.

2. The web-services interface provider of claim 1, wherein said security binding extension element comprises a signature attribute operable to specify whether said message is to be digitally signed prior to transmission to said service provider.

3. The web-services interface provider of claim 2, wherein a value for said signature attribute is selected from the group consisting of "none", "optional" and "required".

4. The web-services interface provider of claim 2, further comprising a digital signature extension element operable to specify details for digitally signing said message in response to said signature attribute requiring said message to be digitally signed.

5. The web-services interface provider of claim 1, wherein said security binding extension element comprises an encryption attribute operable to specify whether said message is to be encrypted prior to transmission to said service provider.

6. The web-services interface provider of claim 5, wherein a value for said encryption attribute is selected from the group consisting of "none", "optional" and "required".

7. The web-services interface provider of claim 5, further comprising an encryption extension element operable to specify details for encrypting said message in response to said encryption attribute requiring said message to be encrypted.

8. The web-services interface provider of claim 1, wherein said security binding extension element comprises a signature supported extension element operable to specify at least one digital signature type supported by said service provider.

9. The web-services interface provider of claim 1, wherein said security binding extension element comprises a signature used extension element operable to specify at least one digital signature type supported by said service provider.

10. The web-services interface provider of claim 1, wherein said security algorithm extension element comprises a signature algorithm supported extension element operable to specify at least one digital signature algorithm supported by said service provider.

11. The web-services interface provider of claim 1, wherein said security algorithm extension element comprises a transform algorithm supported extension element operable to specify at least one transform algorithm supported by said service provider.

12. The web-services interface provider of claim 1, wherein said security algorithm extension element comprises a digest algorithm supported extension element operable to specify at least one digest algorithm supported by said service provider.

13. The web-services interface provider of claim 1, wherein said security algorithm extension element comprises a canonicalization algorithm supported extension element operable to specify at least one canonicalization algorithm supported by said service provider.

14. The web-services interface provider of claim 1, wherein said security algorithm extension element comprises a signature algorithm used extension element operable to specify at least one digital signature algorithm used by said service provider.

15. The web-services interface provider of claim 1, wherein said security algorithm extension element comprises a transform algorithm used extension element operable to specify at least one transform algorithm used by said service provider.

16. The web-services interface provider of claim 1, wherein said security algorithm extension element comprises a canonicalization algorithm used extension element operable to specify at least one canonicalization algorithm used by said service provider.

17. The web-services interface provider of claim 4, wherein said digital signature extension element comprises an attachment signature approach extension element operable to specify a method for digitally signing an attachment to said message.

18. The web-services interface provider of claim 4, wherein said digital signature extension element comprises a parts to be signed extension element operable to specify a list of parts of said message to be digitally signed.

19. The web-services interface provider of claim 18, wherein said digital signature extension element comprises an adherence attribute operable to specify an extent to which said service provider adheres to said list of parts of said message to be digitally signed.

20. The web-services interface provider of claim 19, wherein a value of said adherence attribute is selected from the group consisting of "optional", "required" and "minimum".

21. The web-services interface provider of claim 4, wherein said digital signature extension element comprises a key types supported signature extension element operable to specify at least one digital signature key type supported by said service provider.

22. The web-services interface provider of claim 7, wherein said encryption extension element comprises an attachment encryption approach extension element operable to specify a method for encrypting an attachment to said message.

23. The web-services interface provider of claim 1, wherein said web-services interface comprises a web-services description language interface.

24. The web-services interface provider of claim 1, wherein said web-services interface comprises a web-services description language document.

25. A web-services interface for a web-service provider, comprising:
a publisher executable by the web-services provider to generate a web-services interface accessible by a web-services requestor over a network, the web-services interface defining a security binding extension element operable to specify at least one security feature for a message transmitted to a service the web-services provider by the web-services requestor, wherein said security binding extension element comprises a signature attribute operable to specify whether said message is to be digitally signed prior to transmission to said service the web-services provider.

26. The web-services interface provider of claim 25, further comprising a security algorithm extension element operable to specify at least one algorithm to be used for securing said message.

27. The web-services interface provider of claim 25, wherein said security binding extension element comprises a signature supported extension element operable to specify at least one digital signature type supported by said service web-services provider.

28. A method for defining a web-service, comprising:
specifying at least one security feature for a message transmitted to a service provider; and
specifying at least one algorithm to be used for securing said message.

29. The method of claim 28, further comprising specifying whether said message is to be digitally signed prior to transmission to said service provider.

30. The method of claim 28, further comprising specifying details for digitally signing said message in response to said at least one security feature requiring said message to be digitally signed.

31. The method of claim 28, further comprising specifying that said service provider requires said message to be digitally signed.

32. The method of claim 28, further comprising specifying whether said message is to be encrypted prior to transmission to said service provider.

33. The method of claim 28, further comprising specifying details for encrypting said message in response to said at least one security feature requiring said message to be encrypted.

34. The method of claim 28, further comprising specifying that said service provider does not allow said message to be encrypted.

35. The method of claim 30, wherein said specifying details for digitally signing comprises specifying a signature packaging type for incorporating a digital signature in said message.

36. The method of claim 30, wherein said specifying details for digitally signing comprises specifying a method for digitally signing an attachment to said message.

37. The method of claim 30, wherein said specifying details for digitally signing comprises specifying a list of parts of said message to be digitally signed.

38. The method of claim 37, wherein said specifying details for digitally signing comprises specifying an extent to which said service provider adheres to said list of parts of said message to be digitally signed.

39. The method of claim 33, wherein said specifying details for encrypting said message comprises specifying a method for encrypting an attachment to said message.

40. The method of claim 33, wherein said specifying details for encrypting said message comprises specifying a list of parts of said message to be encrypted.

41. The method of claim 40, wherein said specifying details for encrypting said message comprises specifying an extent to which said service provider adheres to said list of parts of said message to be encrypted.

42. A method for providing a web-service, comprising:
determining whether a web-services interface for said web-service requires a web-services message to be encrypted;
determining whether said web-services message is encrypted in a manner specified by said web-services interface in response to said web-services interface requiring said web-services message to be encrypted;
determining whether said web-services interface requires said web-services message to be digitally signed;
determining whether said web-services message has been digitally signed in a manner specified by said web-services interface in response to said web-services interface requiring said web-services message to be digitally signed; and
processing said web-services message in response to said web-services message being secured in a manner specified by said web-services interface.

43. The method of claim 42, further comprising transmitting an error message in response to said web-services message not being encrypted in a manner specified by said web-services interface.

44. The method of claim 42, further comprising transmitting an error message in response to said web-services message not being digitally signed in a manner specified by said web-services interface.

45. The method of claim 42, further comprising:
determining, prior to said processing, whether an attachment to said web-services message has been digitally signed in a manner specified by said web-services interface; and
processing said web-services message in response to said attachment being digitally signed in said specified manner.

46. The method of claim 42, further comprising:
determining whether said web-services interface prohibits said web-services message from being digitally signed; and
transmitting an error message in response to determining that said web-services interface prohibits said web-services message from being digitally signed and that said web-services message has been digitally signed.

47. The method of claim 42, further comprising:
determining whether said web-services interface prohibits said web-services message from being encrypted; and
transmitting an error message in response to determining that said web-services interface prohibits said web-services message from being encrypted and that said web-services message has been encrypted.

* * * * *

UNITED STATES PATENT AND TRADEMARK OFFICE
CERTIFICATE OF CORRECTION

PATENT NO. : 7,444,675 B2
APPLICATION NO. : 10/376693
DATED : October 28, 2008
INVENTOR(S) : Dorothea Beringer et al.

It is certified that error appears in the above-identified patent and that said Letters Patent is hereby corrected as shown below:

In column 3, line 57, delete "specifics" and insert -- specifies --, therefor.

In column 6, line 19, delete "specifics" and insert -- specifies --, therefor.

In column 8, line 9, delete "specifics" and insert -- specifies --, therefor.

In column 11, line 15, delete "specifics" and insert -- specifies --, therefor.

In column 11, line 41, delete "supported" and insert -- used --, therefor.

In column 16, line 9, delete "specifics" and insert -- specifies --, therefor.

In column 17, line 37, delete ""attachmentEncrypionApproach"" and insert -- "attachmentEncryptionApproach" --, therefor.

In column 23, line 56, delete "(o" and insert -- to --, therefor.

In column 24, line 39, delete "chemicalization" and insert -- canonicalization --, therefor.

In column 26, line 43, delete "arc" and insert -- are --, therefor.

In column 33, line 24, in Claim 1, after "provider" delete "interface for a web-service".

In column 33, line 32, in Claim 1, after "to" delete "a service".

In column 33, line 37, in Claim 2, after "web-services" delete "interface".

In column 33, line 42, in Claim 3, after "web-services" delete "interface".

In column 33, line 45, in Claim 4, after "web-services" delete "interface".

UNITED STATES PATENT AND TRADEMARK OFFICE
CERTIFICATE OF CORRECTION

PATENT NO. : 7,444,675 B2
APPLICATION NO. : 10/376693
DATED : October 28, 2008
INVENTOR(S) : Dorothea Beringer et al.

It is certified that error appears in the above-identified patent and that said Letters Patent is hereby corrected as shown below:

In column 33, line 51, in Claim 5, after "web-services" delete "interface".

In column 33, line 55, in Claim 6, after "web-services" delete "interface".

In column 33, line 58, in Claim 7, after "web-services" delete "interface".

In column 33, line 62, in Claim 8, after "web-services" delete "interface".

In column 33, line 66, in Claim 9, after "web-services" delete "interface".

In column 34, line 25, in Claim 10, after "web-services" delete "interface".

In column 34, line 30, in Claim 11, after "web-services" delete "interface".

In column 34, line 35, in Claim 12, after "web-services" delete "interface".

In column 34, line 40, in Claim 13, after "web-services" delete "interface".

In column 34, line 45, in Claim 14, after "web-services" delete "interface".

In column 34, line 51, in Claim 15, after "web-services" delete "interface".

In column 34, line 56, in Claim 16, after "web-services" delete "interface".

In column 34, line 61, in Claim 17, after "web-services" delete "interface".

In column 34, line 66, in Claim 18, after "web-services" delete "interface".

In column 35, line 3, in Claim 19, after "web-services" delete "interface".

In column 35, line 8, in Claim 20, after "web-services" delete "interface".

UNITED STATES PATENT AND TRADEMARK OFFICE
CERTIFICATE OF CORRECTION

PATENT NO. : 7,444,675 B2
APPLICATION NO. : 10/376693
DATED : October 28, 2008
INVENTOR(S) : Dorothea Beringer et al.

It is certified that error appears in the above-identified patent and that said Letters Patent is hereby corrected as shown below:

In column 35, line 12, in Claim 21, after "web-services" delete "interface".

In column 35, line 17, in Claim 22, after "web-services" delete "interface".

In column 35, line 22, in Claim 23, after "web-services" delete "interface".

In column 35, line 25, in Claim 24, after "web-services" delete "interface".

In column 35, line 28, in Claim 25, after "web-services" delete "interface for a web-service".

In column 35, line 35, in Claim 25, after "to" delete "a service".

In column 35, line 39, in Claim 25, after "to" delete "said service".

In column 35, line 41, in Claim 26, after "web-services" delete "interface".

In column 35, line 45, in Claim 27, after "web-services" delete "interface".

In column 35, line 48, in Claim 27, after "by" delete "said service".

Signed and Sealed this

Eleventh Day of August, 2009

David J. Kappos
*Director of the United States Patent and Trademark Office*